United States Patent [19]

Sakai et al.

[11] Patent Number: 4,584,656
[45] Date of Patent: Apr. 22, 1986

[54] SIGNAL ACCUMULATING TIME CONTROL METHOD AND APPARATUS FOR A SIGNAL ACCUMULATING TYPE RADIATION SENSING DEVICE

[75] Inventors: Shinji Sakai; Nobuhiko Shinoda; Takao Kinoshita, all of Tokyo; Kazuya Hosoe, Kunitachi, all of Japan

[73] Assignee: Canon Kabushiki Kaisha, Tokyo, Japan

[21] Appl. No.: 408,714

[22] Filed: Aug. 16, 1982

[30] Foreign Application Priority Data

Aug. 26, 1981 [JP] Japan ................... 56-134445

[51] Int. Cl.[4] ............................................. H04N 3/14
[52] U.S. Cl. .................................. 364/569; 250/204; 358/213; 364/525
[58] Field of Search ............... 364/524, 525, 527, 555, 364/569; 354/163, 165, 402, 403, 404, 407; 250/200, 201, 201 PF, 204; 377/2, 11, 20; 356/1, 3, 4; 358/213

[56] References Cited

U.S. PATENT DOCUMENTS

| | | | |
|---|---|---|---|
| 4,283,137 | 8/1981 | Tsunekawa et al. | 250/201 X |
| 4,335,942 | 6/1982 | Tsunekawa et al. | 250/201 PF X |
| 4,341,953 | 7/1982 | Sakai et al. | 250/204 |
| 4,360,833 | 11/1982 | Kinoshita et al. | 358/213 |
| 4,368,978 | 1/1983 | Tsunekawa et al. | 354/402 X |
| 4,382,267 | 5/1983 | Angle | 358/213 |
| 4,410,261 | 10/1983 | Masunaga et al. | 250/201 PF X |
| 4,414,469 | 11/1983 | Ogasawara | 250/204 X |
| 4,470,676 | 9/1984 | Kinoshita et al. | 250/204 X |
| 4,484,223 | 11/1984 | Tsunekawa | 358/213 |

OTHER PUBLICATIONS

Robinson, Lloyd B.; "The Lick Observatory Charge-Coupled Device (CCD) and Controller"; SPIE, vol. 290, Solid State Imagers for Astronomy (1981); FIG. 1.

Primary Examiner—Errol A. Krass
Assistant Examiner—Kevin J. Teska
Attorney, Agent, or Firm—Fitzpatrick, Cella, Harper & Scinto

[57] ABSTRACT

In a signal accumulating time control method and apparatus for a signal accumulating type radiation sensing device which produces an electrical signal corresponding to the amount of incident radiation and accumulates the same, an accumulating time controller has first and second different control modes and is adapted to change over from one of said first and second control modes to the other when the intensity of said incident radiation fluctuates a large amount.

14 Claims, 24 Drawing Figures

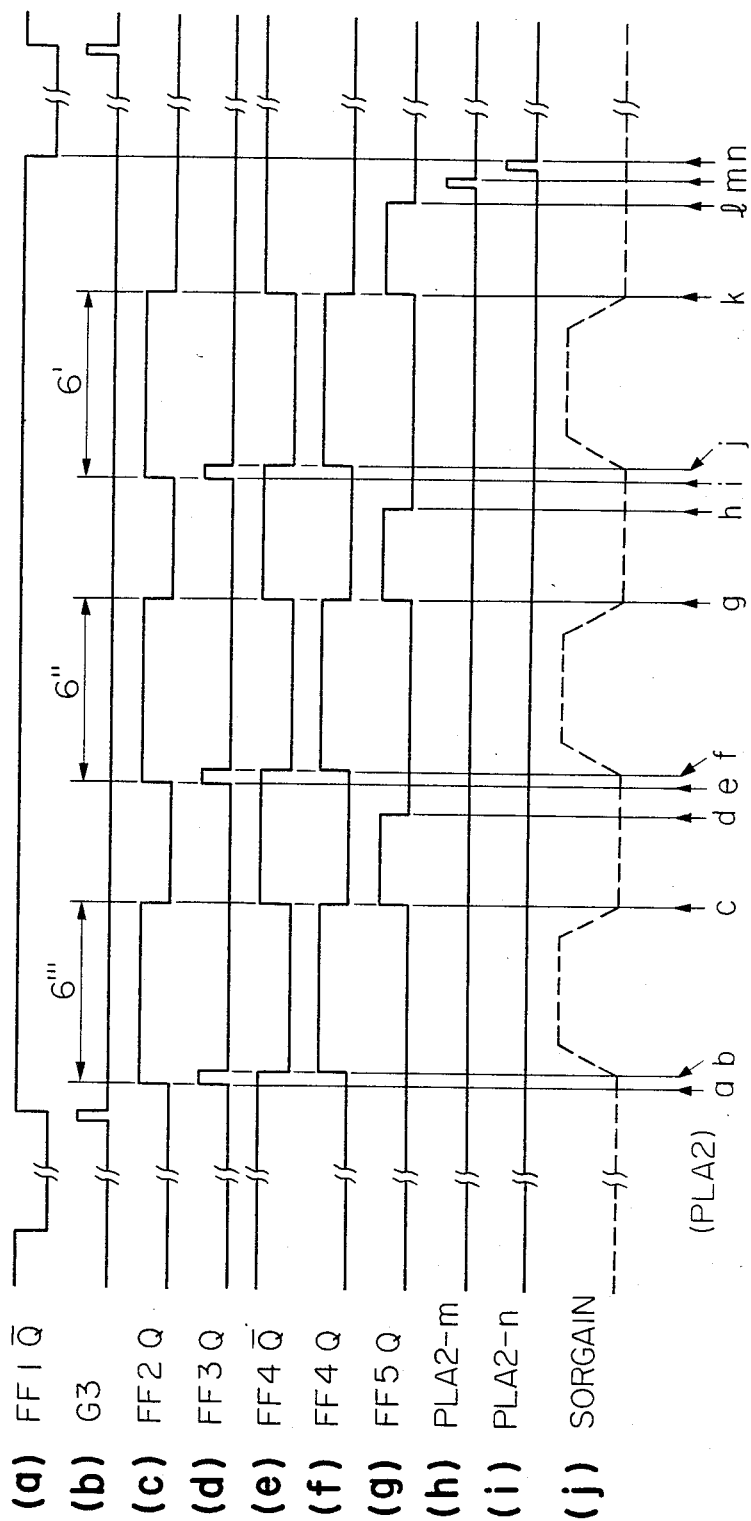

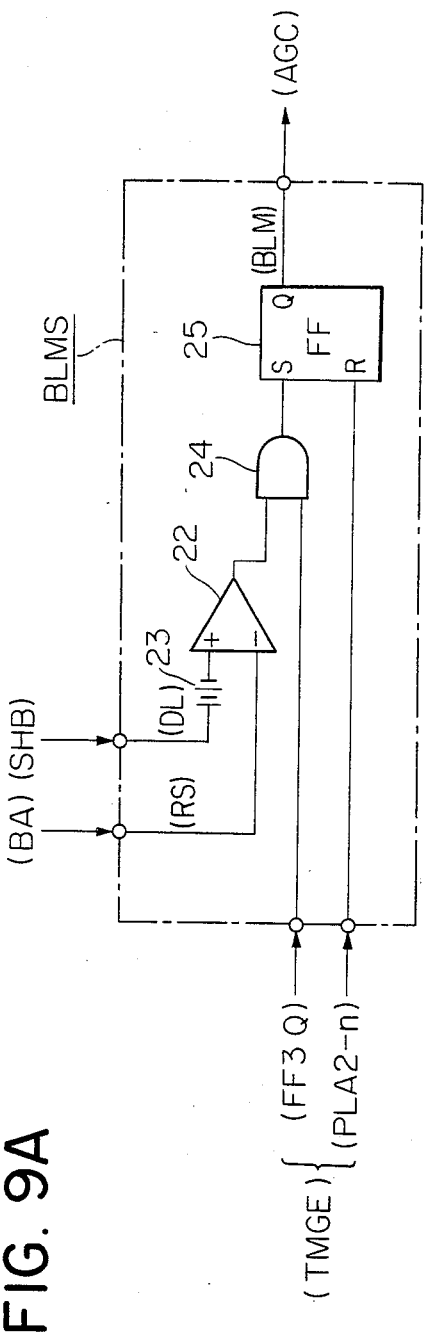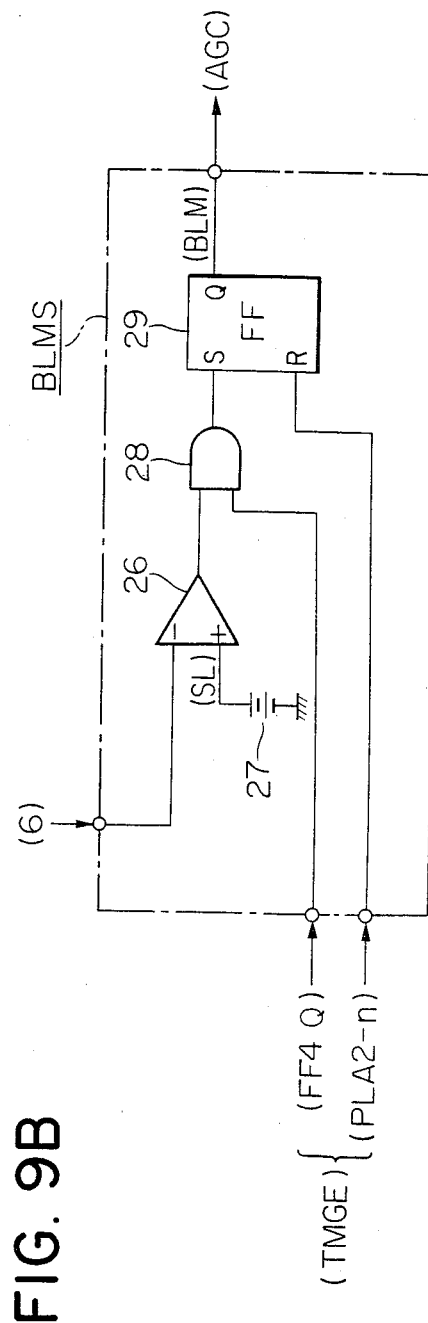
FIG. 9A
FIG. 9B

SIGNAL ACCUMULATING TIME CONTROL METHOD AND APPARATUS FOR A SIGNAL ACCUMULATING TYPE RADIATION SENSING DEVICE

BACKGROUND OF THE INVENTION

1. Field of the Invention

This invention relates to a signal accumulating time control method and apparatus for a signal accumulating type radiation sensing device which produces an electrical signal corresponding to the amount of incident radiation and accumulates the same.

2. Description of the Prior Art

For example, in the use of a solid state image sensing device such as CCD which has been remarkably developed in recent years, it is known that the signal accumulating time thereof must be appropriately controlled in accordance with the amount of light incident on the light-receiving surface thereof to obtain a good image output. Various methods and apparatus for controlling the accumulating time have been proposed. For example, a feedback control method wherein the output level of the image sensing device is compared with a predetermined threshold (upper limit and lower limit) and on the basis of the result of the comparison, control of the accumulating time is effected in the next operation cycle has already been known in the art. In this method, along a predetermined plurality of separate accumulating times, the accumulating time is prolonged or shortened each time as required, by the result of one output read-out (that is, this is a step-by-step follow-up type control). However, in such control method, for example, in a case where it is necessary to change the accumulating time greatly as when the intensity of incident radiation fluctuates greatly, a considerably long time is required until an appropriate accumulating time corresponding to the amount of light incident on the light-receiving surface of the image sensing device is reached, and a problem in the responsiveness arises in a case where any system operation is effected after an image signal is obtained. Particularly, in a camera or the like using such a solid state image sensing device (not only for image sensing but also including a focus detecting device, for example), the time required until the normal operation of the system is performed against the great fluctuation of the intensity of incident radiation is a very important factor which determines the performance of the system, and the shorter this is, the more preferable it is.

SUMMARY OF THE INVENTION

In view of the above-noted situation, the present invention has as its primary object the provision of a novel, useful method and apparatus capable of performing a rapid and appropriate accumulating time control of a signal accumulating type radiation sensing device even in a case where it is necessary to change the accumulating time greatly as when the intensity of incident radiation fluctuates greatly in using such device.

With such object, according to the present invention, there are provided a novel, advantageous accumulating time control method and apparatus having first and second control mode different from each other modes and which, when the intensity of incident radiation varies remarkably, automatically shifts the accumulating time control mode from one of the first and second control modes to the other, thereby being capable of effecting very suitable control of the signal accumulating time in the case where the accumulating time must be changed greatly as described above.

It is another object of the present invention to provide a novel, advantageous accumulating time control method and apparatus which, particularly when the intensity of incident radiation increases remarkably, can quickly control the accumulating time to a short time value suitable therefor.

With such object, according to a preferred embodiment of the present invention which will hereinafter be described, there are provided an accumulating time control method and apparatus which may automatically shift from one of the first and second control modes to the other by detecting any excessive creation of a signal in the sensing device.

The above-mentioned excessive creation of a signal can be discriminated, for example, by detecting the so-called blooming. As regards the detection of blooming, there are also various direct or indirect methods as shown in the embodiment.

According to the preferred embodiment of the present invention, the technique of successive approximation at different intervals is adopted as the second control mode. Incidentally, said first control mode is the so-called follow-up mode wherein on the basis of the output level of the sensing device, control of the accumulating time of the sensing device is performed on a step-by-one step basis.

Thus, the speed at which the accumulating time, in the case where a great change of the accumulating time is required, is controlled to a proper value is very much higher than in the prior art.

Other objects and features of the present invention will become apparent from the following detailed description of some embodiments thereof taken in conjunction with the accompanying drawings.

BRIEF DESCRIPTION OF THE DRAWINGS

The preferred embodiments of the present invention will now be described with reference to the accompanying drawings, in which:

FIGS. 1A to 1C are model views for explaining the principle of focus detection operation of an example of a focus detecting system to which the present invention may be applied, wherein FIG. 1A shows the optical arrangement of the focus detecting system, FIG. 1B shows the configuration of light-receiving sections of a photoelectric transducer element shown in FIG. 1A, and FIG. 1C shows changes in sharpness of the image at three points in FIG. 1A;

FIG. 7 is a timing chart showing timing signals for controlling various operations which are output from the timing generator shown in FIG. 6;

FIGS. 9A and 9B are block diagrams showing two specific examples of the blooming detecting circuit according to the blooming detecting method explained in FIGS. 8A to 8C;

DESCRIPTION OF THE PREFERRED EMBODIMENTS

The following description of the embodiments of the present invention will be made by taking as an example a focus detecting device in a camera or the like which is considered to be a suitable application of the accumulating time control method and apparatus according to the present invention. Of course, however, the present invention is useful not only for such example, but is also useful for apparatus using a signal accumulation type radiation sensing device known as a solid state image sensing element.

Figure 1A:
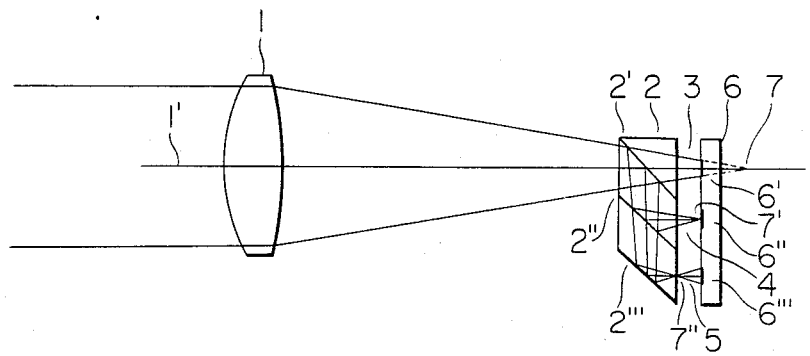

Referring first to FIG. 1A, an imaging lens 1 has an optical axis 1'. A beam splitter 2 is disposed in the optical path of the imaging lens 1 and has semi-transmittal sections 2' and 2" and a total reflection section 2'''. In FIG. 1A, it is shown that light emerging from the imaging lens 1 becomes incident on the semi-transmittal section 2' of such beam splitter 2 and is then divided into three separate light rays 3, 4 and 5 by the semi-transmittal section 2" and the total reflection section 2'''. If the semi-transmittal section 2' has a characteristic that it transmits about one-third of the incident light and reflects the remaining two-thirds and the other semi-transmittal section 2" has a characteristic that it transmits about one half of the incident light and reflects the remaining one half of the incident light, it is apparent that the energy for the three divided light rays becomes substantially the same. Designated by 6 is a photoelectric transducer such as a solid state image sensing element having three light-receiving sections 6', 6" and 6'''.

If the convergent point of the light ray 3 by the imaging lens 1 is at point 7, it is easily seen that the convergent points of the divided light rays 4 and 5 are at points 7' and 7", respectively. If the convergent point 7' of the light ray 4 which is reflected and divided by the semi-transmittal section 2" coincides with the light-receiving section 6", the convergent point 7 of the light ray 3 incident on the light-receiving section 6' is located behind the light-receiving section 6', and the convergent point 7" of the light ray 5 incident on the light-receiving section 6''' is located in front of the light-receiving section 6'''. The deviations of these converging points 7 and 7" from the light-receiving sections 6' and 6''' become the same if the distances between the semi-transmittal sections 2' and 2" and between 2" and the total reflection section 2''' are equal to each other. As a result, the sharpness of the image on the light-receiving section 6" becomes maximum, and the sharpnesses of the images on the light-receiving sections 6' and 6''' become low but are similar to each other.

Figure 1B:
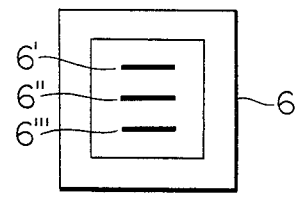
Figure 1C:
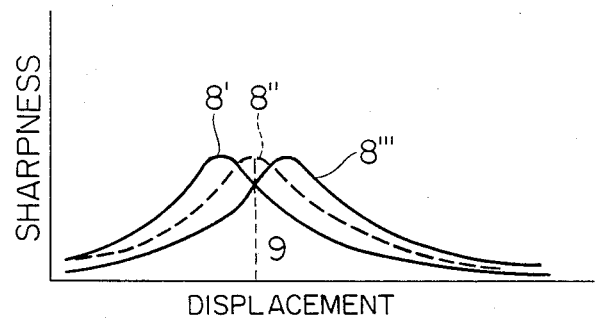

If the imaging lens 1 is displaced along the optical axis 1', the sharpnesses of the images on the light-receiving sections 6', 6" and 6''' change as shown in FIG. 1C. That is, curves 8', 8" and 8''' representing the sharpnesses of the images on the light-receiving sections 6', 6" and 6''' and the changes therein form three juxtaposed peaks in FIG. 1C, wherein the displacement of the imaging lens 1 is plotted as the abscissa (when rightward displacement takes place, the rightward displacement is rightward in the direction of the abscissa) and the sharpness is plotted as the ordinate. The condition shown in FIG. 1A corresponds to point 9 shown in FIG. 1C. If the light-receiving surface of the light receiving section 6" of the photoelectric transducer 6 is arranged to substantially coincide with the predetermined focal plane (the film surface in the case of a camera) of the imaging lens 1, it is detected that the imaging lens 1 is in the in-focus state under the condition shown in FIG. 1A, that is, when the relationships between the sharpnesses of the images on the respective light-receiving sections 6', 6" and 6''' are represented by the point 9 in FIG. 1C. Then, it is apparent from FIG. 1C that the relationships of the magnitudes between the sharpnesses 8' and 8''' are inverted according to whether the imaging plane of the lens 1 is in front of or behind the light-receiving section 6". As a result, the near-focus state and the far-focus state of the imaging lens 1 with respect to the predetermined focal plane can be detected.

FIG. 1B is a front view of the photoelectric transducer 6 wherein the respective light-receiving sections 6', 6" and 6''' comprise, for example, belt-shaped linear CCDs. However, the shape of the light-receiving sections is not necessarily limited to that shape.

Figure 2:
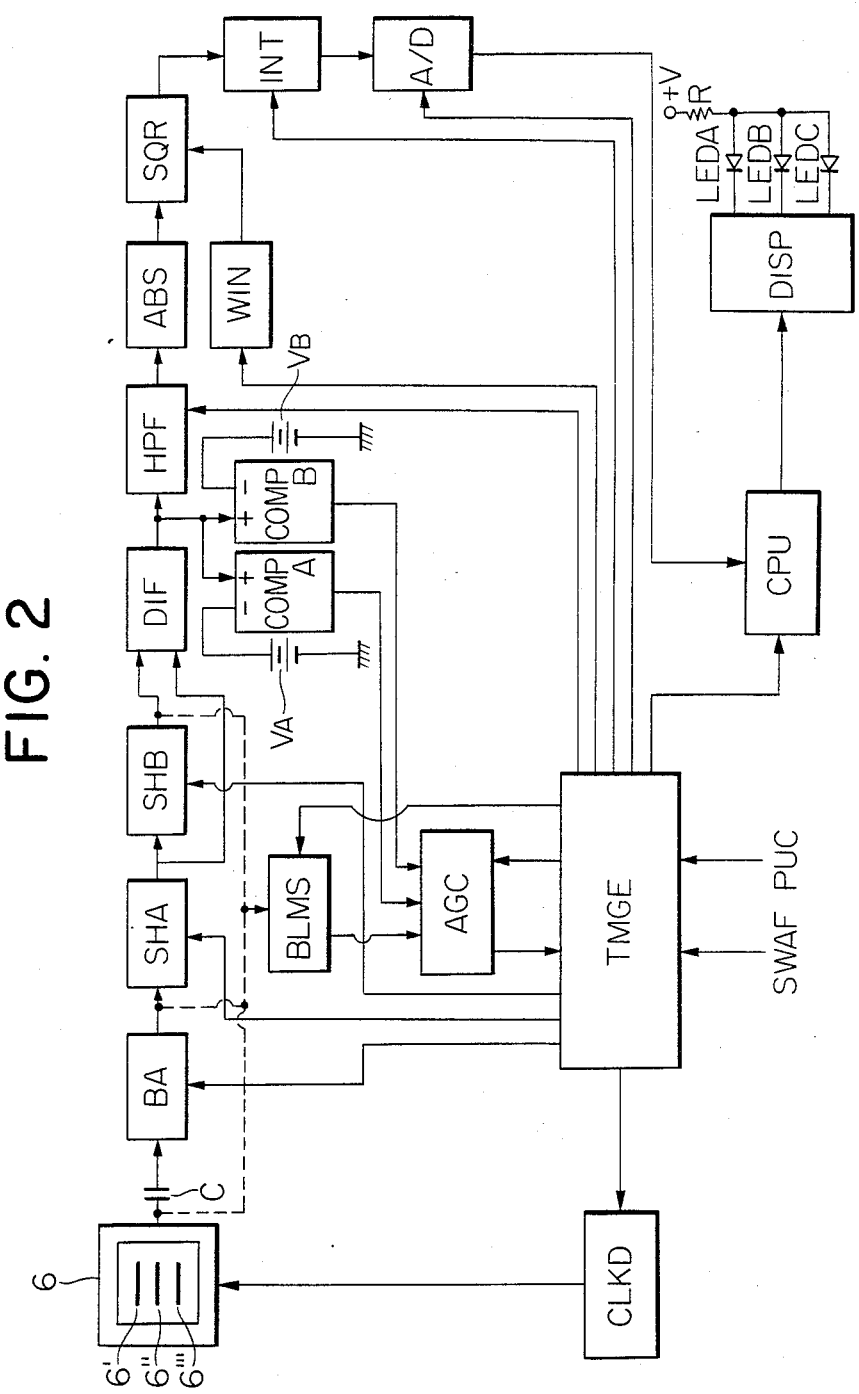
FIG. 2 is a block diagram showing the configuration of the electric circuitry of an embodiment in which the improvement of the present invention is applied to a focus detecting system according to the principle shown in FIGS. 1A to 1C.

A focus detecting system is thus obtained which employs the beam splitter 2 and the photoelectric transducer 6 having the three light-receiving sections 6', 6" and 6'''. FIG. 2 shows a block diagram of an electric circuit which reads image signals from the light-receiving sections 6', 6" and 6''', extracts image sharpness signals from said image signals and discriminates the magnitudes of sharpness of the images at three points. Many of the blocks shown in FIG. 2 are of known configuration and details of them are shown in a series of applications such as U.S. patent application Ser. No. 59,635, "Focus Detecting System", Kinoshita et. al, filed on July 23, 1979 (corresponding to German DOLS 29 30 636) U.S. patent application Ser. No. 151,703, "Image Sharpness Detecting System", Kawabata et. al, filed on May 20, 1980 now U.S. Pat. No. 4,377,742 (corresponding German Patent Application P 30 19 908. 7) both filed in behalf of the assignee of the present invention. Therefore, only parts which are essentially related to the present invention will be described.

Referring to FIG. 2, the photoelectric transducer 6 shown in FIG. 1 comprises a CCD having the three light-receiving sections 6', 6" and 6'''. A series of clock signals for operating the CCD 6 are supplied from a clock driver CLKD. These clock signals are supplied to initiate a series of operations of the CCD 6 such as charge accumulation, charge transfer, charge resetting, etc. in a predetermined order as is well known. The charge stored in the CCD for a predetermined period of time and transferred therefrom is converted into the voltage at an output portion of the CCD 6 and is thereafter input, as an image signal, to a balance adjusting circuit BA through a capacitor C for suppressing noise. The image signals corresponding to the three light-receiving sections 6', 6" and 6'" of the CCD 6 are time-serially read out in an order which is determined by the configuration of the CCD 6.

Figure 3:
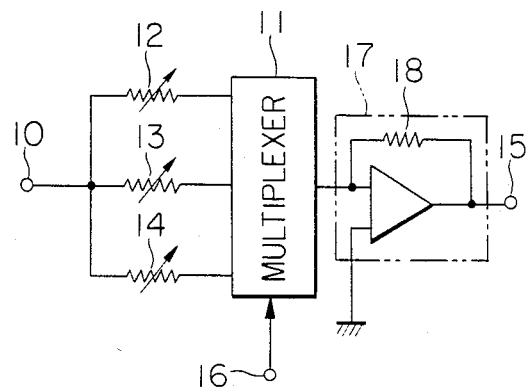
FIG. 3 is a partial circuit diagram showing an example of a balance adjusting circuit shown in the circuitry of FIG. 2.

The balance adjusting circuit BA, as shown in FIG. 3, has a multiplexer 11 of known configuration and three variable resistors 12, 13 and 14 connected together. Referring to FIG. 3, the image signal as described above is input to a terminal 10 and supplied to the multiplexer 11 through the variable resistors 12, 13 and 14. The multiplexer 11 receives from a terminal 16 a signal providing the timing at which the image signals corresponding to the light-receiving sections 6', 6" and 6'" are input, and outputs those image signals to an amplifier 17 through the variable resistors 12, 13 and 14. The variable resistors 12, 13 and 14 control the balance of the image signals from the light-receiving sections 6', 6" and 6'". The outputs from the resistors 12, 13 and 14 are input to the amplifier 17, where the gains of the respective images are controlled according to their ratios by a feedback resistor 18 and then are input to the next electric circuit. Balance adjustment of such image signals is useful when there is an inbalance in the three light rays 3, 4 and 5 divided by the beam splitter 2. The synchronizing signal provided from the terminal 16 is supplied from a timing generator TMGE which will hereinafter be described. Although three variable resistors are used in this embodiment, two variable resistors may of course be used to balance two image signals in relation to the remaining image signal.

Signal processing in this circuitry must be performed according to a series of synchronizing signals which are supplied from the timing generator TMGE. In response to an operation command signal SWAF of the circuitry (in the case of a camera, a signal generated in synchronism with the depression of a shutter release button to the first position) and a power up clear signal PUC, the timing generator TMGE generates the various synchronizing signals to the respective blocks in the circuitry in a predetermined order. The timing generator TMGE may be of known configuration and need only generate the group of synchronizing signals suitable for the operation of the circuitry of this embodiment. The clock driver CLKD also operates in response to the synchronizing signal from the timing generator TMGE.

The image signals adjusted by the balance adjusting circuit BA are input to a first sampling and holding circuit SHA. The first sampling and holding circuit SHA shapes the image signals from the CCD 6. In response to a sampling pulse from the timing generator TMGE synchronous with the output of the image signals from the CCD 6, the first sampling and holding circuit SHA samples and holds the level of the respective image signals.

The ambient temperature and accumulating time of the CCD influence the dark current since the actual CCD comprises a semiconductor. The actual image signal includes the dark current level superposed on the signal corresponding to the actual amount of incident light. Thus, the image signal contains a noise component. Therefore, part of the light-receiving section of the CCD is masked with an aluminum mask or the like, and a signal output from this part is considered to be the dark current level. Then, the difference is obtained between the output from the unmasked light-receiving section and the output of the masked part (hereinafter referred to as a dark current bit), that is, the dark current level, to thereby remove the influence of the dark current. The dark current bit (not shown) is included at the top part of each of the light-receiving sections 6', 6" and 6'" of the CCD 6, so that this bit is output first.

A second sampling and holding circuit SHB is arranged to serve to sample and hold the output level of these dark current bits through circuit SHA. The second sampling and holding circuit SHB receives commands from the timing generator TMGE for holding said output level for a predetermined time. A differential amplifier DIF receives the output signal from the sampling and holding circuit SHA and the output signal from the sampling and holding circuit SHB to take the difference between these two inputs. Thus, the image signals obtained as the output of the differential amplifier DIF are signals whose dark current level is cancelled and which correctly correspond to the amount of incident light.

The output of the differential amplifier DIF is then input to two comparators COMPA and COMPB. A reference voltage VA is supplied to the comparator COMPA and a reference voltage VB is supplied to the comparator COMPB. The comparators COMPA and COMPB constitute a window comparator.

Figure 4A:
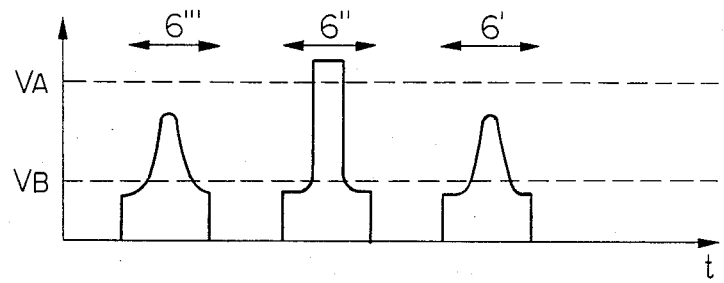
FIGS. 4A to 4C show signal waveforms for explaining the function of a window comparator shown in FIG. 2 which discriminates if the accumulating time is appropriate.
Figure 4B:
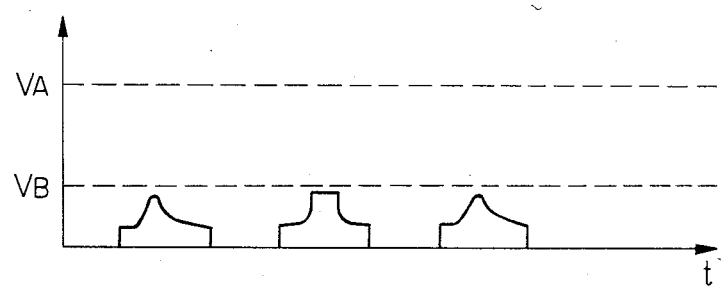
Figure 4C:
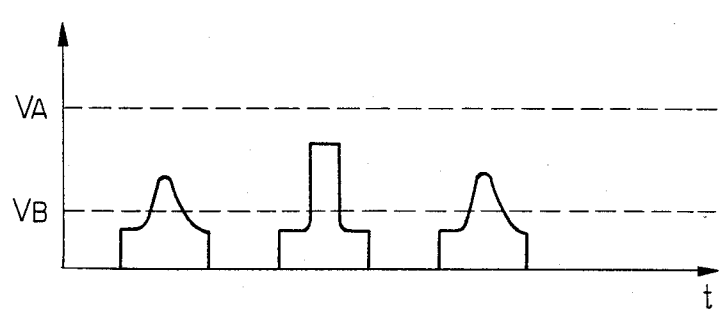

The operation of the window comparator will now be described with reference to FIG. 4. FIGS. 4A, 4B and 4C show the relationship between the peak value of the image signal compensated for by the dark current (hereinafter referred to as the dark current-compensated image signal) and the reference voltages VA and VB, the time being plotted as the abscissa and the voltage being plotted as the ordinate. The ranges in FIG. 4A indicated by arrows 6'", 6" and 6' represent the timings with which the image signals are output from the light-receiving sections 6'", 6" and 6', respectively, of the CCD 6. In FIG. 4A, part of the dark current-compensated signal (part of 6") exceeds the reference voltages VA and VB, and the signal level is too high. In this case, the outputs of both the comparators COMPA and COMPB are at high level. In FIG. 4B, the dark current-compensated signal is lower than the reference voltage VB in all ranges and the signal level is too low. In this case, the outputs of both the comparators COMPA and COMPB are at low level. In FIG. 4C, the peak value of the dark current-compensated signal is between the reference voltages VA and VB and is at a proper level. In this case, only the output of the comparator COMPB is at high level and the output of the comparator COMPA is at low level. If the reference voltages VA and VB are so selected as to set the proper level of the dark current-compensated signal in this circuitry, the combination of the high or low level of the outputs of the comparators COMPA and COMPB indicates the appropriateness of the dark current-compensated signal level. If $VA > VB$ in this embodiment, when the outputs of both the comparators COMPA and COMPB are at high level, it indicates that the dark current-compensated signal is at too high a level, including the saturated level. When the outputs of both the comparators COMPA and COMPB are at low level, it indicates that the dark current-compensated signal level is too low. Only when the output of the comparator COMPA is at low level and the output of the comparator COMPB is at high level is the dark current-compensated signal at a proper level.

The outputs of the comparators COMPA and COMPB are supplied to an accumulating time control circuit AGC to maintain the appropriate dark current-compensated signal level by shortening the accumulating time of the CCD 6 when it is too high and by prolonging the accumulating time when it is too low. In response to a synchronizing signal from the timing generator TMGE, the accumulating time control circuit AGC operates so that it may be able to discriminate the state of the outputs of the comparators COMPA and COMPB at the timing at which the dark current-compensated signals are output from the light-receiving sections 6', 6" and 6'". Based on the output state of the comparators COMPA and COMPB, the accumulating time control circuit AGC outputs a command signal to shorten or prolong the accumulating time to the timing generator TMGE. In response to the command signal, the timing generator TMGE operates the clock driver CLKD so that the accumulating time of the CCD 6 may be shortened or prolonged when the next output of the CCD 6 is read out. A block designated by BLMS is a blooming detecting circuit provided to detect so-called blooming when it occurs in the CCD 6 for some reason or other and as a result, to alter the accumulating time control operation and quickly make the level of the output signal of the CCD 6 proper. The blooming detecting circuit BLMS is designed to receive at least one of the output of the CCD 6 or the output of the balance adjusting circuit BA or the output of the second sampling and holding circuit SHB and to impart an accumulating time control operation change command signal to the accumulating time control circuit in response to the timing signal from the timing generator TMGE. Details of the blooming detecting circuit BLMS will later be described with reference to FIGS. 8A to 8C, 9A and 9B. Which of (a) the output of the CCD 6, (b) the output of the balance adjusting circuit BA or (c) the output of the second sampling and holding circuit SHB is input to the blooming detecting circuit BLMS is based on how the blooming is to be detected.

The output of the differential amplifier DIF is also input to a high-pass filter HPF. The high-pass filter HPF evaluates the degree of change in the image. The high-pass filter HPF extracts the high frequency components from the image signal as a first step in evaluating the sharpness of the image. The timing generator TMGE supplies to the high-pass filter HPF a synchronizing signal which is synchronous with the timing at which the image signals corresponding to the light-receiving sections 6', 6" and 6'" of the CCD 6 are input. This is to prevent the generation of an output from the high-pass filter HPF which is independent of the sharpness of the image and which is caused by an abrupt change in the signal at the initial period. This synchronizing signal temporarily resets the high-pass filter HPF.

The output of the high-pass filter HPF is supplied to a squaring circuit SQR through an absolute value circuit ABS. The absolute value circuit ABS takes the absolute value of the output from the high-pass filter HPF. Since there may be both a positive and a negative change in the image signal (from light to dark and from dark to light), if the output of the high-pass filter HPF were directly supplied to an integrating circuit INT to be described later, the outputs may cancel each other and the signal representing the sharpness of the image might become zero depending upon the image pattern. The absolute value circuit ABS is incorporated to prevent this. The squaring circuit SQR may be realized by utilizing, for example, nonlinear input/output characteristics of a semiconductor. The function of the squaring circuit SQR in this circuitry is to emphasize and evaluate the peak output of the high-pass filter HPF, that is, the state wherein the change of the image signal with time is great and the sharpness is higher. The squaring circuit SQR incorporates a window function generating circuit WIN. This is to prevent, by lowering the weight for evaluation of the sharpness of the image near the edge of the field of view, the introduction of errors in the normal evaluation of the sharpness when an image outside the field of view enters the field of view as part of the out-of-focus image. This is also to prevent the introduction of transient error when another image enters the field of view due to blurring of the image formed by the imaging lens 1. The output of the window function generating circuit WIN controls the gain of the squaring circuit SQR so that it may become low at the edge of the field of view and become high at the center. Thus, in response to the timing signal from the timing generator TMGE synchronous with the initiation of operation of the light-receiving sections 6', 6" and 6'" of the CCD 6 and with the read-out of each element of the CCD 6, the window function generating circuit WIN controls the gain of the squaring circuit SQR according to the relationship predetermined in correspondence with the location (location in the field of view) at which each element is read out from the signal input time.

The output of the squaring circuit SQR including the emphasized sharpness data is input to the integrating circuit INT which performs integration for the entire area of the light-receiving sections and outputs the sharpness of the image at each of the light-receiving sections. A synchronizing signal is also supplied from the timing generator TMGE to the integrating circuit INT so that integration and integration resetting may be performed at the timings corresponding to the light-receiving sections 6', 6" and 6'". In this manner, the output of the integrating circuit INT corresponds to the electric output such as the sharpness of the respective images corresponding to the order of output from the light-receiving sections 6', 6" and 6'" of the CCD.

The analog output of the integrating circuit INT is supplied to a conventional A-D converting circuit A/D for conversion into a digital value so that the signal processing may be facilitated for discrimination at a central processing unit CPU of an in-focus state, a near-focus state and a far-focus state of the imaging lens 1.

FIGS. 5A-5F show the output waveforms of the respective blocks of the circuitry in order to clarify the analog processing of the series of signals representing the sharpness of the image, starting from the read-out of the image signals from the light-receiving sections 6', 6" and 6'" of the CCD 6, i.e., the field of view for three images, until the integration at the integrating circuit INT. In FIGS. 5A-5F, time is plotted as the abscissa and the voltage or current output is plotted as the ordinate in arbitrary units. The ranges indicated at arrows 6', 6" and 6'" in FIG. 5 represent the timings with which the signals corresponding to the light-receiving sections 6', 6" and 6'" of the CCD 6 are read out and processed. The state of the respective images corresponds to the in-focus state of the imaging lens 1 in which the sharpness of the image of the light-receiving section 6" is highest, that is, the sharpness as shown at 9 in FIG. 1C is highest. FIG. 5 shows the state of the signal output from the CCD 6 only once, but these signals are repeatedly output in practice.

Figure 5A:
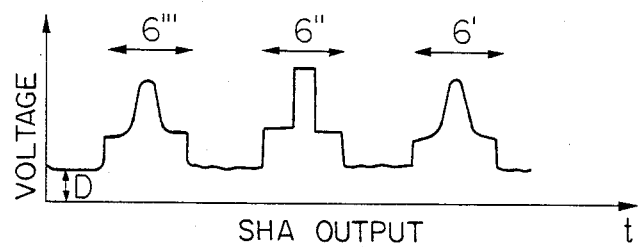
FIGS. 5A to 5F show output waveforms of the outputs of the main blocks of the circuitry shown in FIG. 2.
Figure 5B:
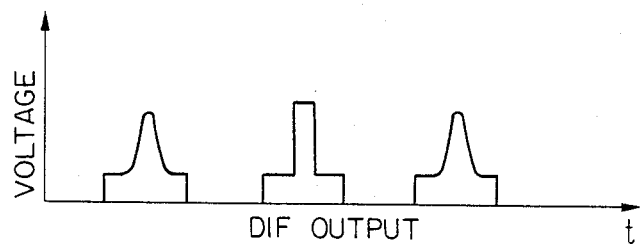
Figure 5C:
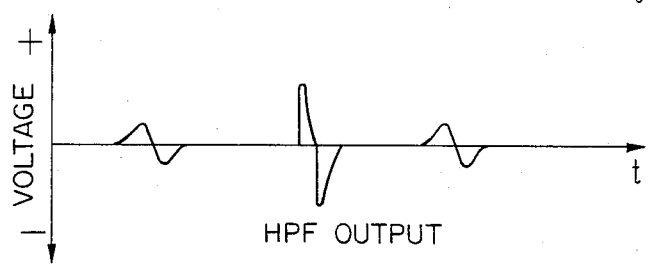
Figure 5D:
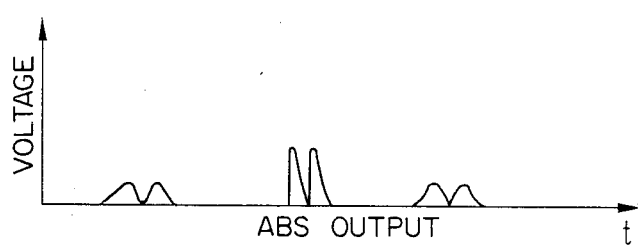
Figure 5E:
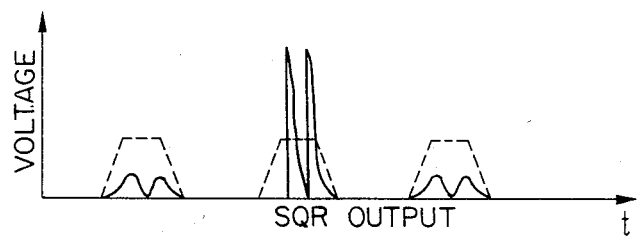
Figure 5F:
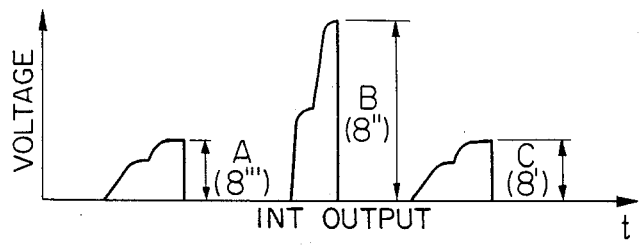

FIG. 5A shows the image signal which is output from the CCD 6 and has passed through the sampling and holding circuit SHA. The order for output of the images from the light-receiving sections is 6''', 6'' and 6'. The voltage indicated by letter D is the dark current level, which is first output and is held by the sampling and holding circuit SHB. FIG. 5B shows the output of the differential amplifier DIF, that is, the dark current-compensated signal in which the dark current level D is cancelled. FIG. 5C shows the output of the high-pass filter HPF. FIG. 5D shows the output of the absolute value circuit ABS. FIG. 5E shows the output of the squaring circuit SQR, wherein the trapezoids indicated by broken lines show the manner in which the gain of the squaring circuit SQR changes within the field of view according to the shape of the window generated by the window function generating circuit WIN described above. FIG. 5F shows the output of the integrating circuit INT wherein levels A(8'''), B(8'') and C(8') correspond to the sharpness of the images on the light-receiving sections 6''', 6'' and 6', respectively, and are called A, B and C. Specifically, A, B and C in FIG. 5F correspond to the levels of the curves 8''', 8'' and 8' of FIG. 1C at the point 9.

The levels A, B and C are converted into digital data by the A-D converting circuit A/D described above and are input to the central processing circuit CPU. The CPU computes the relationships among the levels A, B and C according to the predetermined conditions of the in-focus state, the near-focus state, the far-focus state and the interruption of the discrimination. Basically, in the in-focus state, conditions $B>A$, $B>C$ and $A=C$ are satisfied, in the near-focus state, condition $C>A$ is satisfied, and in the far-focus state, condition $A>C$ is satisfied. The CPU discriminates which set of conditions is satisfied and outputs a signal corresponding to one of these three states. As the algorithm for the discrimination at the CPU, there may be adopted the algorithm as disclosed in U.S. patent application Ser. No. 151,533, "Focus Detecting System", Sakai et. al, filed on May 19, 1980 (corresponding German Patent Application No. P 30 19 901. 0), now U.S. Pat. No. 4,341,953 or in U.S. patent application Ser. No. 310,373, "Focusing State Discriminating System", Sakai et. al, filed on Oct. 9, 1981, both filed in behalf of the assignee of the present application.

The output of the central processing circuit CPU is input to a subsequent display circuit DISP. The display DISP basically comprises a logic circuit and a drive circuit for driving indicators such as LEDs. In response to the commands from the central processing circuit CPU, in this embodiment, the display circuit DISP lights up a light-emitting diode LEDA in the in-focus state, lights up a light-emitting diode in the near-focus state, or lights up a light-emitting diode LEDC in the far-focus state, to indicate that the imaging lens 1 is in the in-focus state, the near-focus state or the far-focus state, respectively. A protective resistor R is incorporated to protect the light-emitting diodes LEDA to LEDC when a voltage V is supplied to them. Although LEDs are used as the indicators in this embodiment, liquid crystal display devices, electrochromines or the like may be used.

The configuration of the timing generator TMGE will be described with reference to FIGS. 6 and 7.

Figure 6:
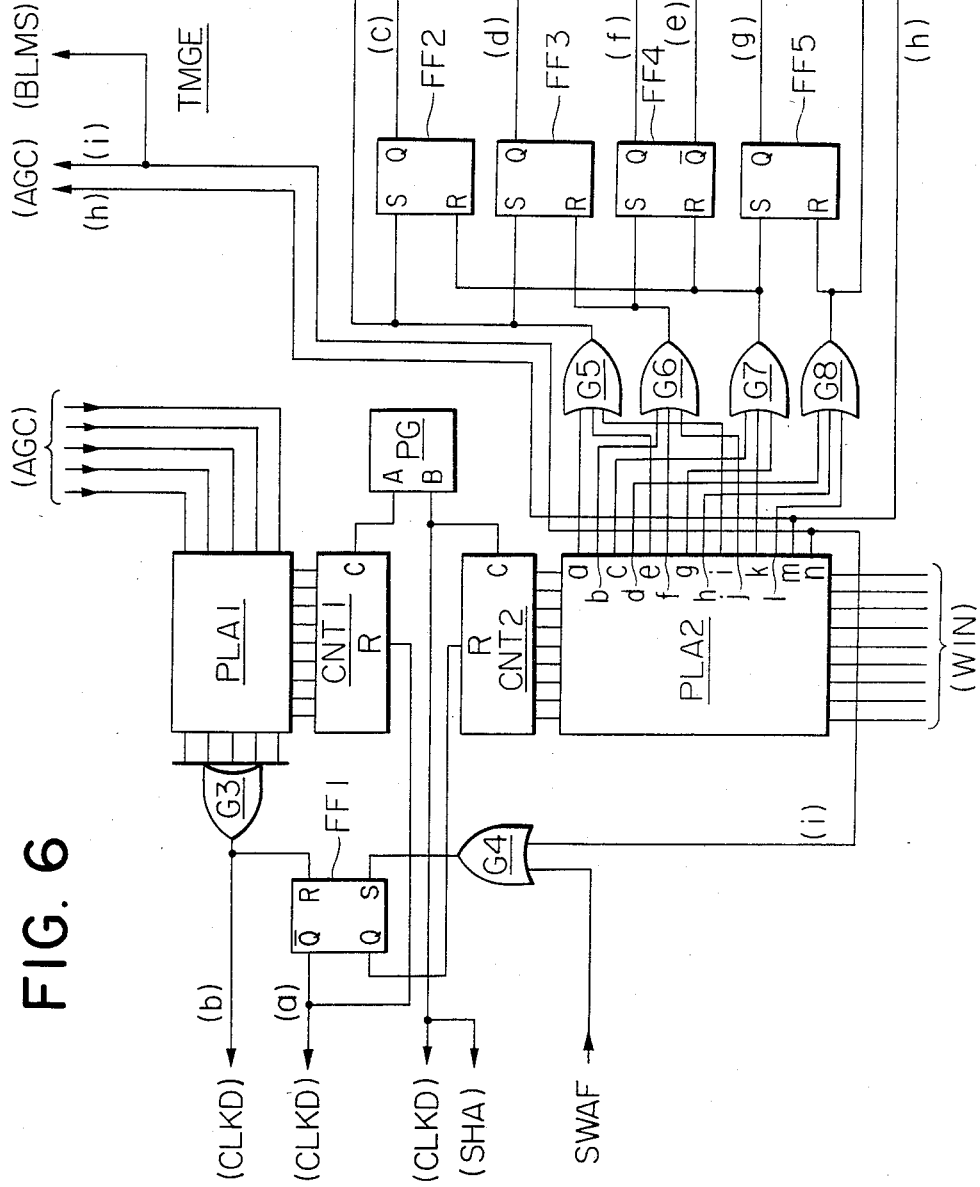
FIG. 6 is a block diagram showing the configuration of a timing generator in the circuitry shown in FIG. 2.

Referring to FIG. 6, the part of the circuitry consisting of a counter CNT1, a programmable logic array PLA1 and an OR gate G3 mainly serves to regulate the accumulating time of the CCD 6. The counter CNT1 counts a pulse train A from a pulse generator PG. When the count of the counter CNT1 reaches a predetermined value which is set by the output of the accumulating time control circuit AGC to be described, the programmable logic array PLA1 generates a timing pulse which is output through the OR gate G3. The output of the OR gate G3 is supplied to the clock driver CLKD, in response to which the clock driver CLKD generates a start pulse (shift pulse) for initiating the output of the signals from the CCD 6. The start pulse is supplied to the CCD 6. The output waveform of the OR gate G3 is as shown in FIG. 7(b).

An RS flip-flop FF1 generates a control signal to the clock driver CLKD to normally set the CCD 6 in the clear condition and to release the clear condition only during the period in which signal integration is required. The RS flip-flop FF1 is set by the operation command signal SWAF described above which is supplied through an OR gate G4 or a pulse signal for repetition of the operation which is generated at a predetermined timing to be described later. The RS flip-flop FF1 is reset by the output of the OR gate G3. The $\overline{Q}$ output of the RS flip-flop FF1 as shown in FIG. 7(a) is supplied as a control signal to the clock driver CLKD. The CCD 6 has an overflow drain gate which is opened or closed according to the $\overline{Q}$ output of the RS flip-flop FF1 (the gate is opened when the $\overline{Q}$ output is at high level and is closed when it is at low level) to thereby control the integration of the signal charge by the CCD 6. The interval shown in FIG. 7(a) in which the $\overline{Q}$ output of the RS flip-flop FF1 is at low level corresponds to the accumulating time of the signal charge, which is defined as an interval from the predetermined timing of setting the RS flip-flop FF1 to the generation of the pulse from the OR gate G3. Since the timing at which the pulse is generated from the OR gate G3 is regulated by the output from the accumulating time control circuit AGC, the accumulating time of the signal charge of the CCD 6 is regulated by the output of the accumulating time control circuit AGC. The $\overline{Q}$ output of the RS flip-flop FF1 is supplied to the counter CNT1 as a reset signal. Therefore, the counter CNT1 performs counting only during the interval in which the $\overline{Q}$ output of the flip-flop FF1 is at low level, and is kept reset in other conditions.

The circuitry part consisting of a counter CNT2, a programmable logic array PLA2, OR gates G5-G8 and RS flip-flops FF2 to FF5 mainly serves to control the respective parts and the overall sequence of the circuit shown in FIG. 2. The counter CNT2 counts a pulse train B from the pulse generator PG. In this embodiment, the CCD 6 is of single-phase driven type. The pulse train B is also supplied to the clock driver CLKD which generates from the pulse train B a drive clock pulse (transfer clock pulse) to be supplied to the CCD 6. The count of the counter CNT2 and the drive (transfer of the charge) of the CCD 6 are in one-to-one correspondence. The pulse train B is also supplied to the sampling and holding circuit SHA as the sampling pulse. The content of the programmable logic array PLA2 is so programmed that, based on the count output from the counter CNT2, pulses are generated from terminals a to n at the respective timings shown in FIGS. 7(a) to 7(j), after the pulse is generated from the OR gate G3. In response to the outputs from the terminals a, e and i of the programmable logic array PLA2, the OR gate G5 produces an output which is supplied to the set terminals of the RS flip-flops FF2 and FF3. In response to the outputs from the terminals b, f and j of the programmable logic array PLA2, the OR gate G6 produces an output which is supplied to the reset terminal of the RS flip-flop FF3 and the set terminal of the RS flip-flop FF4. In response to the outputs from the terminals c, g and k of the programmable logic array PLA2, the OR gate G7 produces an output which is supplied to the reset terminals of the RS flip-flops FF2 and FF4 and to the set terminal of the RS flip-flop FF5. In response to the outputs from the terminals d, h and l of the programmable logic array PLA2, the OR gate G8 produces an output which is supplied to the reset terminal of the RS flip-flop FF5. The Q outputs of the RS flip-flops FF2 to FF5 and the $\overline{Q}$ output of the RS flip-flop FF4 are shown in FIGS. 7(c) to 7(g) as contrasted with the timings (shown in FIG. 7(b)) at which the signals are output from the respective light-receiving sections 6''', 6'' and 6' of the CCD 6. The Q output (FIG. 7(c)) of the RS flip-flop FF2 is supplied to the balance adjusting circuit BA. The high level interval of the Q output (FIG. 7(d)) of the RS flip-flop FF3 corresponds to the dark current bit at the end of each of the outputs of the light-receiving sections 6''', 6'' and 6', and is supplied to the sampling and holding circuit SHB as a sampling pulse. The Q output of the RS flip-flop FF3 is also supplied to the integrating circuit INT as a reset signal. The low level interval of the $\overline{Q}$ output (FIG. 7(e)) of the RS flip-flop FF4 corresponds to the effective image signal bit of the output of each of the light-receiving sections 6''', 6'' and 6', and is supplied to the high-pass filter HPF as a reset signal. In this manner, the high-pass filter HPF is released from the reset condition only during the low level interval of the $\overline{Q}$ output of the RS flip-flop FF4. The Q output (FIG. 7(f)) of the RS flip-flop FF4 is supplied to the integrating circuit INT as an integration command signal. The Q output (FIG. 7(g)) of the RS flip-flop FF5 is supplied to the A-D convertion circuit A/D as an A-D conversion command. The output of the OR gate G5 is supplied to the A-D converting circuit as a reset signal. The output of the OR gate G3 is supplied to the central processing circuit CPU as a strobe pulse for storing the output from the A-D converting circuit A/D. The output (FIG. 7(h)) from the terminal m of the programmable logic array PLA2 is supplied to the accumulating time control circuit AGC as a count pulse for an accumulation time data storing UP/DOWN counter (in FIGS. 10A and 10C) or as a strobe pulse for a group of accumulating time data storing D-flip-flops (in FIG. 11) in the accumulating time control circuit AGC and also to the central processing unit CPU as a latch pulse for latching the outputs thereof. The output (FIG. 7(i)) from the terminal n of the programmable logic array PLA2 is supplied to the OR gate G4 as a set signal of the RS flip-flop FF1 as well as to the accumulating time control circuit AGC and to the blooming detecting circuit BLMS as a reset signal for the detecting flip-flops therein to be described. The Q output of the flip-flop FF1 (the inverted signal of the $\overline{Q}$ output shown in FIG. 7(a)) is supplied to the counter CNT2 as a reset signal. If the counter CNT1 is in the count-enabling mode, the counter CNT2 is placed under the reset condition. If the counter CNT1 is under the reset condition, the counter CNT2 is set in the count-enabling mode. The count of the counter CNT2 is output to the window function generating circuit WIN. In response to the count output from the counter CNT2, the window function generating circuit WIN performs gain control so that the gain of the squaring circuit SQR changes as shown in FIG. 7(j). The window function generating circuit WIN may be of the configuration as disclosed in U.S. patent application Ser. No. 151,703, filed on May 20, 1980 by Kawabata et. al, (corresponding German Patent Application No. P 30 19 908.7) of the assignee of the present invention.

Reference is now had to FIGS. 8A to 8C, 9A and 9B to describe the details of the blooming detecting circuit BLMS. Several methods of blooming detection will first be described with reference to FIGS. 8A to 8C.

Figures 8A, 8B, 8C:
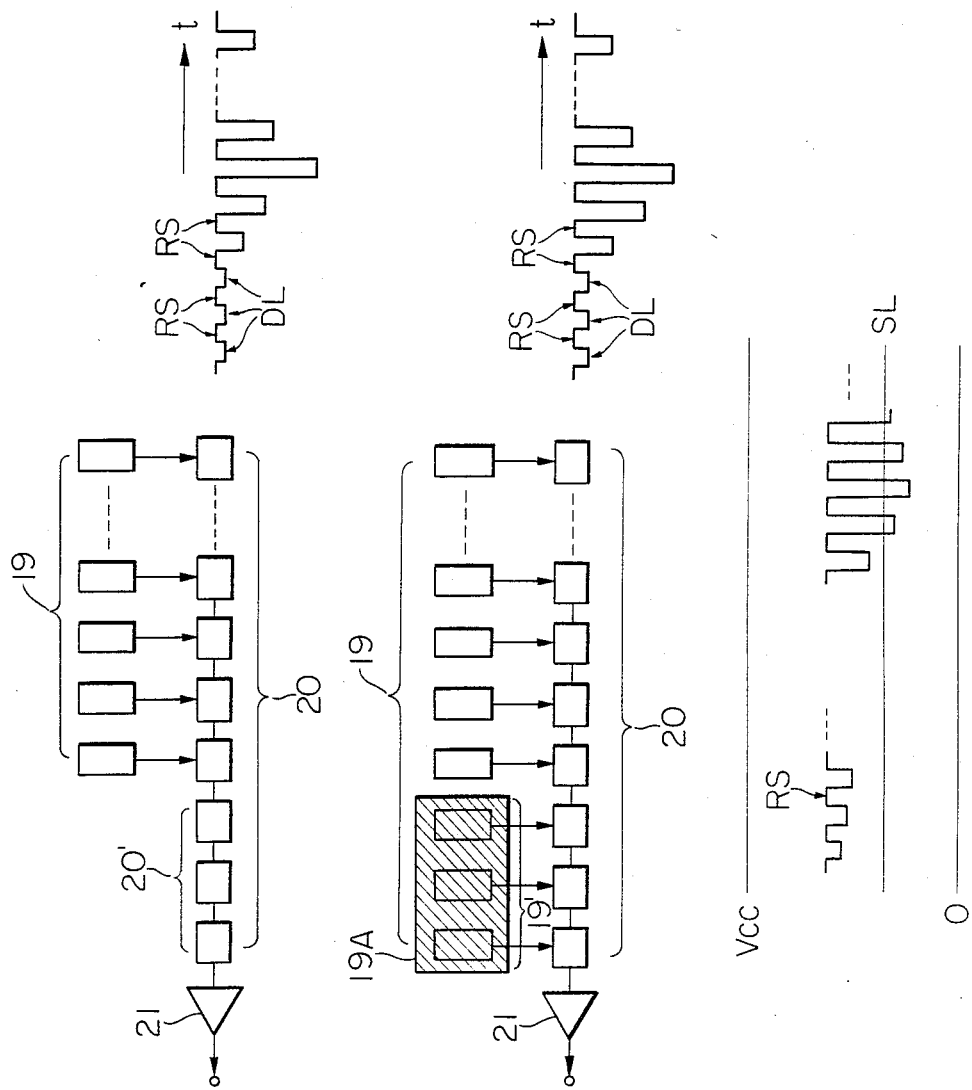
FIGS. 8A to 8C explain three examples of the blooming detecting method by the blooming detecting circuit in the circuitry shown in FIG. 2.

FIG. 8A shows a method of comparing the reset level of the CCD with the output from a part of the transfer portion which does not correspond to the photoelectric transducer and recognizing that blooming has occurred when the difference between the two exceeds a predetermined value. FIG. 8B shows a method of masking a part of the photoelectric transducer with an aluminum mask, comparing the output level of the masked part with the reset level of the CCD and recognizing that blooming has occurred when the difference between the two exceeds a predetermined value. Both of these methods utilize the fact that when blooming has occurred in the CCD, the signal level of the particular location, namely, the output level corresponding to the dark current output level, rises. In FIGS. 8A and 8B, reference numeral 19 designates the photoelectric transducer. The charge stored in the photoelectric transducer 19 is transferred in a direction indicated by arrow and shifts to a transfer portion 20, and is successively transferred leftwardly as viewed in the figures and, at an output portion 21, there are produced signals corresponding to the individual photoelectric transducer elements as shown at the right-hand side of the figures. Each of the upper flat portions of the output signal which are indicated by RS is the reset level of the CCD and the left lower flat portions of the output signal which are indicated by DL show, in FIG. 8A, the output of a part 20' of the transfer portion 20 which does not correspond to the photoelectric transducer and, in FIG. 8B, the output level of the photoelectric transducer 19' masked with an aluminum mask 19A. Detection of blooming is performed by utilization of the fact that the difference between the level DL corresponding to the dark current and the reset level RS is enlarged by blooming. FIG. 8C shows a method wherein, unlike the above-described methods, a discrimination level SL is provided between the source voltage level Voc and the zero level and it is recognized that blooming has occurred when the output level of the CCD exceeds the discrimination level SL.

FIGS. 9A and 9B show examples of the construction of the blooming detecting circuit BLMS based on the blooming detection methods described above in connection with FIGS. 8A to 8C. FIG. 9A corresponds to FIGS. 8A and 8B, and FIG. 9B corresponds to FIG. 8C. In FIG. 9A, a comparator 22 receives at the inverting and non-inverting inputs thereof the signals from the balance adjusting circuit BA and the second sampling and holding circuit SHB shown in FIG. 2 and produces a signal corresponding to the difference between said signals, namely, the magnitude of the dark current output level DL and of the reset level RS of the CCD 6. Designated by 23 is a bias voltage source for providing a predetermined level difference between said two levels and thereby setting a threshold value which recognizes blooming. When the output of the second sampling and holding circuit SHB becomes greater than the output of the balance adjusting circuit BA by the difference determined by the level of the bias voltage source 23, the output of the comparator 22 becomes high and therefore, one input of an AND gate 24 becomes high. A signal (FIG. 7(d)—the Q output of the flip-flop FF3 of FIG. 6) which becomes high only during a period corresponding to the sampling period of the second sampling and holding circuit SHB, namely, a period corresponding to the period during which the level DL corresponding to thd dark current described in connection with FIGS. 8A and 8B is output, is supplied to the other input of the AND gate 24 from the timing generator TMGE and accordingly, if blooming is occurring, a flip-flop 25 is set and the Q output thereof becomes high, and this Q output is supplied to the accumulating time control circuit AGC as a blooming detection signal BLM. The flip-flop 25 receives a timing signal (FIG. 7(i)—the output of the terminal n of the programmable logic array PLA2 of FIG. 6) from the timing generator TMGE so that it may be reset after the read-out of the outputs of the three light-receiving sections 6', 6" and 6''' of the CCD 6 is all terminated and at the beginning of the next read-out. In FIG. 9B, the output from the CCD 6 is input to the inverting input of a comparator 26 while the voltage of a voltage source 27 for biasing a voltage corresponding to the threshold value level SL is imparted to the non-inverting input of the comparator 26. When the output level of the CCD 6 becomes low as compared with the threshold value level SL, that is, when the output level of the CCD 6 exceeds the threshold value level SL as shown in FIG. 8C, the output of the comparator 26 becomes high and therefore, one input of an AND gate 28 becomes high. A signal (FIG. 7(f)—the Q output of the flip-flop FF4 of FIG. 6) which becomes high during a period corresponding to the period of the output from each effective portion of the light-receiving sections 6', 6" and 6''' of the CCD 6 is imparted to the other input of the AND gate 28 from the timing generator TMGE and accordingly, if blooming is occurring, a flip-flip 29 is set and the Q output thereof becomes high, and this Q output is supplied to the accumulating time control circuit AGC as a blooming detection signal BLM. The flip-flop 29, like the flip-flop 25 shown in FIG. 9A, is reset by the signal from the timing generator TMGE shown in FIG. 7(i) (the output of the terminal n of the programmable logic array PLA2 shown in FIG. 6).

Figure 10A:
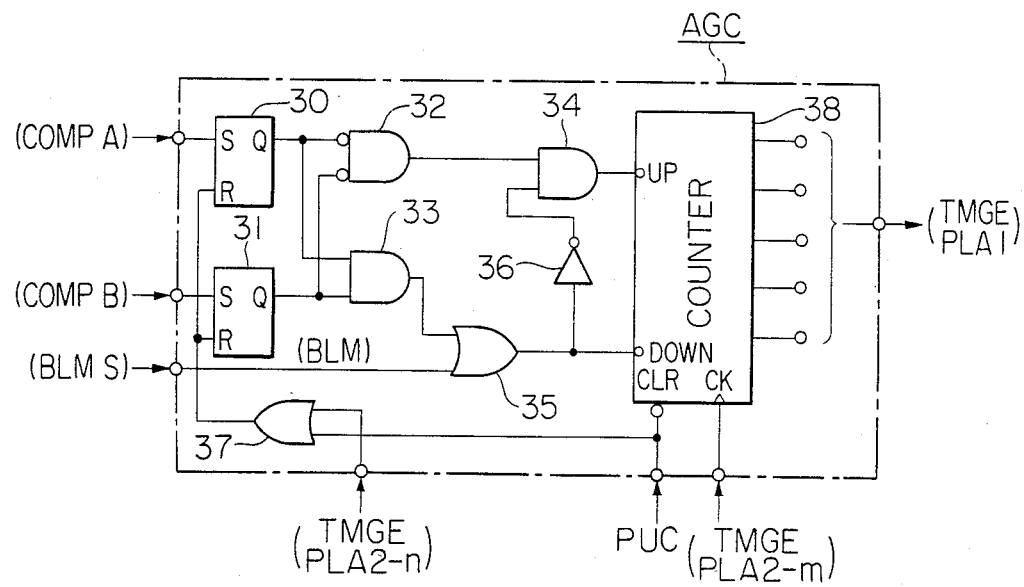
FIGS. 10A and 10B are block diagrams showing two specific examples of an accumulating time control circuit usable with the blooming detecting circuits shown in FIGS. 9A and 9B.
Figure 10B:
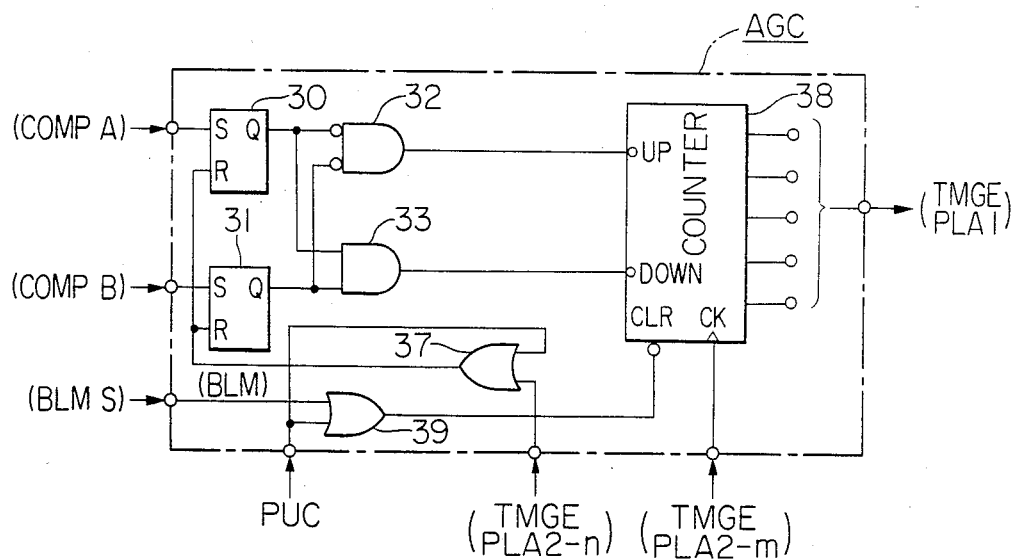

Reference is now had to FIGS. 10A and 10B to describe two conceivable examples of the accumulating time control circuit AGC which can immediately shorten the accumulating time in response to the blooming detection signal BLM as described above from the blooming detecting circuit BLMS whenever blooming occurs.

Referring to FIG. 10A, the accumulating time control circuit AGC encircled by a dot-and-dash line receives as input signals the output signals of the comparators COMPA and COMPB and the blooming detection signal BLM from the blooming detection circuit BLMS. When the blooming detection signal BLM is low, that is, when blooming does not occur, (i) if both the comparators COMPA and COMPB assume high level, that is, if the signal level is excessively high, both flip-flops 30 and 31 are set and the Q outputs thereof become high and therefore, the output of an AND gate 32 becomes low and the output of an AND gate 33 becomes high and accordingly, the output of an AND gate 34 becomes low and the output of an OR gate 35 becomes high, and an up-down counter 38 receives a DOWN count command and, by the count pulse (FIG. 7(h)—the output of the terminal m of the programmable logic array PLA2 of FIG. 6) from the timing generator TMGE, the accumulating time level is shortened by one step and a command is imparted to the timing generator TMGE (the programmable logic array PLA1 of FIG. 6);

(ii) if both the comparators COMPA and COMPB assume low level, that is, if the signal level is excessively small, neither of the flip-flops 30 and 31 is set and the Q outputs thereof remain low and therefore, the output of the AND gate 32 becomes high and the output of the AND gate 33 becomes low and accordingly, the output of the OR gate 35 becomes low and the output of an inverter 36 becomes high and consequently, the output of the AND gate 34 becomes high and the up-down counter 38 receives an UP count command and, by the count pulse (FIG. 7(h)—the output of the terminal m of the programmable logic array PLA2 of FIG. 6) from the timing generator TMGE, the accumulating time level is prolonged by one step and a command is imparted to the timing generator TMGE; and (iii) if only the comparator COMPB assumes high level, that is, if the signal level is appropriate, only the flip-flop 31 is set and the Q output thereof becomes high and therefore, both the outputs of the AND gates 32 and 33 become low and accordingly, the output of the OR gate 35 also becomes low and the output of the AND gate 34 also becomes low, and the up-down counter 38 does not receive an UP count command or a DOWN count command and the previous accumulating time is maintained.

If blooming occurs in the above-described cases, the output of the OR gate 35 becomes high and the up-down counter 38 unconditionally assumes the DOWN count mode and, in response to the timing signal from the timing generator TMGE during each cycle, the accumulating time is shortened as long as the blooming detection signal BLM is high, whereby blooming is prevented.

The example of FIG. 10B is entirely similar to the example of FIG. 10A in that the UP count command or the DOWN count command of the up-down counter 38 is effected on the basis of the signals of the comparators COMPA and COMPB, while in the example of FIG. 10B, when the blooming detection signal BLM from the blooming detecting circuit BLMS becomes high, a clear signal is imparted to the up-down counter 38 through an OR gate 39 and the counter 38 is cleared and therefore, the shortest accumulating time is set. In this manner, when blooming occurs, the accumulating time is quickly set to the shortest time value.

In FIGS. 10A and 10B, the up-down counter 38 is designed to be cleared by the power up clear signal PUC. Accordingly, in FIG. 10B, the OR gate 39 is designed to receive the power up clear signal PUC in addition to the blooming detection signal BLM from the blooming detecting circuit BLMS. Both the flip-flops 30 and 31 are designed to be reset by the power up clear signal PUC and the signal from the timing generator TMGE shown in FIG. 7(i) (the output of the terminal n of the programmable logic array PLA2 of FIG. 6) through the OR gate 37.

The examples of FIGS. 10A and 10B will be more or less considered. As regards the example of FIG. 10A, even when blooming occurs, the accumulating time is only shortened by one step and accordingly, as the countermeasure for the sharp change of the intensity of incident light which is called blooming, there is a difficulty that too much time is required until the accumulating time reaches a proper time value. On the other hand, in the example of FIG. 10B, such difficulty is eliminated and a rapid control for eliminating any blooming which may occur is possible, whereas it is in no way guaranteed that as the time value for eliminating blooming and yet obtaining a proper level of CCD output, the shortest accumulating time is a proper time value, and accordingly, even if blooming is eliminated by the shortest accumulating time, when the level of the CCD output has become excessively small, much time is required much time until such an optimum accumulating time that a proper level of CCD output is obtained is restored and after all, generally, this is not the perfect way to compensate for the occurrence of blooming.

Figure 11:
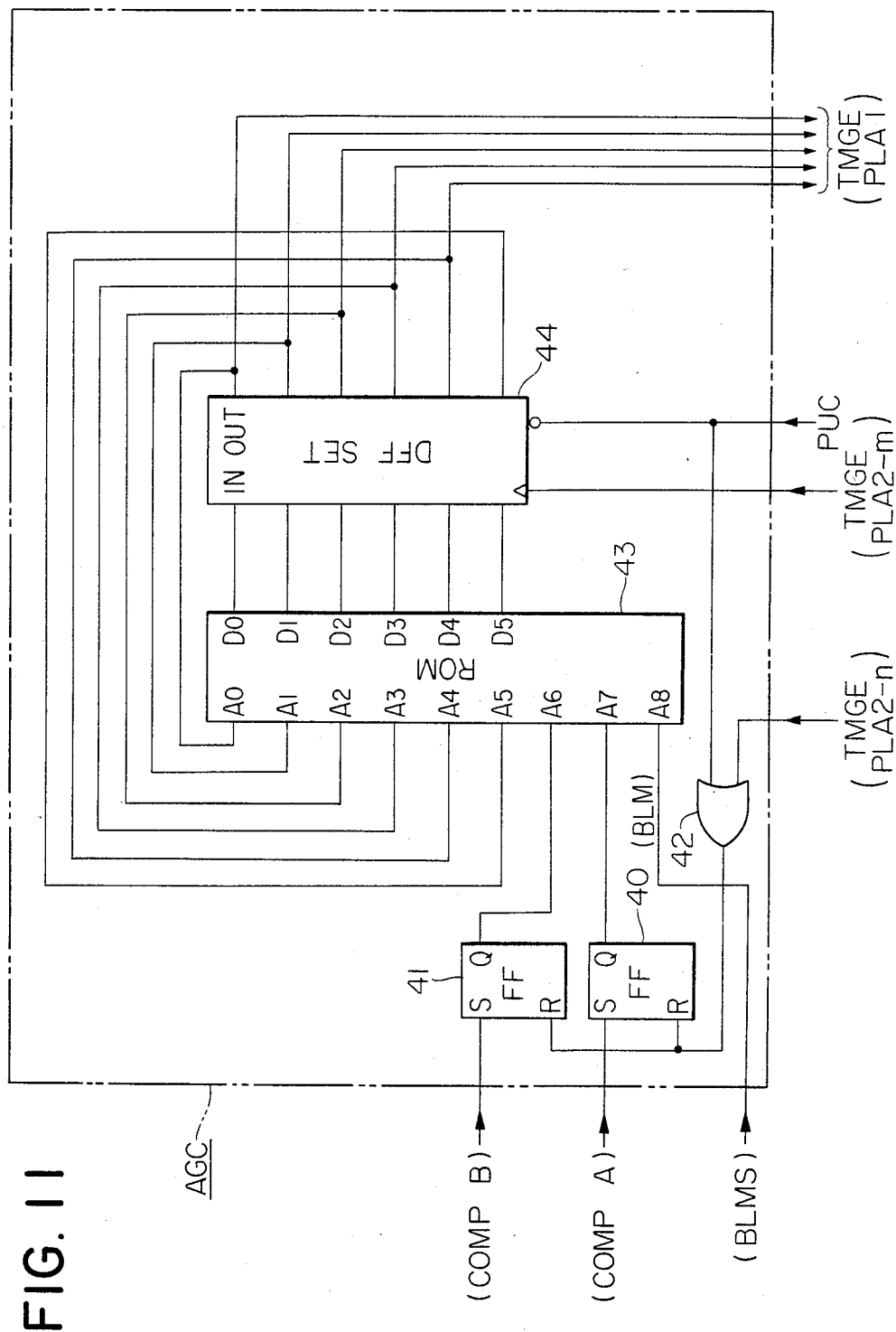
FIG. 11 is a block diagram showing as an embodiment of the present invention an example of the accumulating time control circuit in the case where the present invention is applied to the circuitry shown in FIG. 2.

Reference is now had to FIG. 11 to describe an example of the accumulating time control circuit AGC which is designed to immediately eliminate any blooming which may occur and to very speedily control the accumulating time to such an optimum time value that a proper level of CCD output is obtained.

Referring to FIG. 11, reference numerals 40 and 41 designate RS flip-flops. The flip-flop 40 is set by the high level of the output of the comparator COMPA and the flip-flop 41 is set by the high level of the output of the comparator COMPB. Both of these flip-flops are so connected that they are reset through an OR gate 42 by the power up clear signal PUC and the high level of the output (FIG. 7(i)) from the terminal n of the programmable logic array PLA2 in the timing generator TMGE shown in FIG. 6. Reference numeral 43 designates an ROM (read only memory), and reference numeral 44 denotes a D-flip-flop set of 6 bit construction. The inputs $A_0$–$A_5$ of the ROM 43 receive the outputs of the flip-flop set 44 and the inputs $A_6$ and $A_7$ of the ROM 43 receive the Q outputs of the flip-flops 41 and 40. Further, the input $A_8$ of the ROM 43 receives the blooming detection signal BLM from the blooming detecting circuit BLMS. The outputs $D_0$–$D_4$ of the ROM 43 produce output data determined by the state of the Q outputs of the flip-flops 41 and 40 and the state of the inputs $A_0$–$A_5$. $D_5$ is an output which performs another command for successive apparoximation or follow-up control. The outputs $D_0$–$D_5$ of the ROM 43 are connected to the inputs of the D-flip-flop set 44 of 6 bit construction. For each accumulating time receiving strobe from the timing generator TMGE (the high level output from the terminal m of the programmable logic array PLA2 of FIG. 6–FIG. 7(h)), the signals of $D_0$–$D_5$ are latched by the flip-flop set 44 and the supplied to the timing generator TMGE (the programmable logic array PLA1 of FIG. 6) as the accumulating time control signal and also fed back to the ROM 43 with the state thereof as the input data to the inputs $A_0$–$A_5$ of the ROM 43. The power up clear signal PUC is produced when the main switch of the system is closed, and this signal clears the D-flip-flop set 44. When the power up clear signal PUC is input to the ROM 43, the state of "0" as the signals of the inputs $A_0$–$A_5$ thereof.

The operation of the accumulating time control circuit AGC having the above-described construction will be described by reference to Table I below which shows the transition of the states of inputs and outputs.

TABLE I

|   |   |   |   |   |   |   |   |   | (i) | (ii) |
|---|---|---|---|---|---|---|---|---|---|---|
|   | BLM (ADR8) | 0 | 0 | 0 | 0 | 0 | 0 | 1 | 1 |
|   | COMP B(ADR6) | 0 | 1 | 1 | 0 | 1 | 1 | X | X |
|   | COMP A(ADR7) | 0 | 0 | 1 | 0 | 0 | 1 | X | X |
|   | UD/SA (ADR5) | 0 | 0 | 0 | 1 | 1 | 1 | 0 | 1 |
|   | OLD DATA(ADR0–4)= 0 | 16(D5=0) | 16(D5=0) | 16(D5=0) | 1(D5=1) | 0(D5=1) | 0(D5=1) | 0(D5=1) | 16(D5=0) |
|   | OLD DATA(ADR0–4)= 1 | 0(D5=0) | 1(D5=1) | 0(D5=0) | 2(D5=1) | 1(D5=1) | 0(D5=1) | 0(D5=1) | 16(D5=0) |
|   | OLD DATA(ADR0–4)= 2 | 0(D5=0) | 2(D5=1) | 0(D5=0) | 3(D5=1) | 2(D5=1) | 1(D5=1) | 0(D5=1) | 16(D5=0) |
|   | OLD DATA(ADR0–4)= 3 | 0(D5=0) | 3(D5=1) | 0(D5=0) | 4(D5=1) | 3(D5=1) | 2(D5=1) | 0(D5=1) | 16(D5=0) |
|   | OLD DATA(ADR0–4)= 4 | 6(D5=1) | 4(D5=1) | 2(D5=1) | 5(D5=1) | 4(D5=1) | 3(D5=1) | 0(D5=1) | 16(D5=0) |
|   | OLD DATA(ADR0–4)= 5 | 0(D5=0) | 5(D5=1) | 0(D5=0) | 6(D5=1) | 5(D5=1) | 4(D5=1) | 0(D5=1) | 16(D5=0) |
|   | OLD DATA(ADR0–4)= 6 | 0(D5=0) | 6(D5=1) | 0(D5=0) | 7(D5=1) | 6(D5=1) | 5(D5=1) | 0(D5=1) | 16(D5=0) |
|   | OLD DATA(ADR0–4)= 7 | 0(D5=0) | 7(D5=1) | 0(D5=0) | 8(D5=1) | 7(D5=1) | 6(D5=1) | 0(D5=1) | 16(D5=0) |
| A | OLD DATA(ADR0–4)= 8 | 12(D5=0) | 8(D5=1) | 4(D5=0) | 9(D5=1) | 8(D5=1) | 7(D5=1) | 0(D5=1) | 16(D5=0) |
|   | OLD DATA(ADR0–4)= 9 | 0(D5=0) | 9(D5=1) | 0(D5=0) | 10(D5=1) | 9(D5=1) | 8(D5=1) | 0(D5=1) | 16(D5=0) |
|   | OLD DATA(ADR0–4)=10 | 0(D5=0) | 10(D5=1) | 0(D5=0) | 11(D5=1) | 10(D5=1) | 9(D5=1) | 0(D5=1) | 16(D5=0) |
|   | OLD DATA(ADR0–4)=11 | 0(D5=0) | 11(D5=1) | 0(D5=0) | 12(D5=1) | 11(D5=1) | 10(D5=1) | 0(D5=1) | 16(D5=0) |
|   | OLD DATA(ADR0–4)=12 | 14(D5=1) | 12(D5=1) | 10(D5=1) | 13(D5=1) | 12(D5=1) | 11(D5=1) | 0(D5=1) | 16(D5=0) |
|   | OLD DATA(ADR0–4)=13 | 0(D5=0) | 13(D5=1) | 0(D5=0) | 14(D5=1) | 13(D5=1) | 12(D5=1) | 0(D5=1) | 16(D5=0) |
|   | OLD DATA(ADR0–4)=14 | 0(D5=0) | 14(D5=1) | 0(D5=0) | 15(D5=1) | 14(D5=1) | 13(D5=1) | 0(D5=1) | 16(D5=0) |
|   | OLD DATA(ADR0–4)=15 | 0(D5=0) | 15(D5=1) | 0(D5=0) | 16(D5=1) | 15(D5=1) | 14(D5=1) | 0(D5=1) | 16(D5=0) |
|   | OLD DATA(ADR0–4)=16 | 24(D5=0) | 16(D5=1) | 8(D5=0) | 17(D5=1) | 16(D5=1) | 15(D5=1) | 0(D5=1) | 16(D5=0) |
|   | OLD DATA(ADR0–4)=17 | 0(D5=0) | 17(D5=1) | 0(D5=0) | 18(D5=1) | 17(D5=1) | 16(D5=1) | 0(D5=1) | 16(D5=0) |
|   | OLD DATA(ADR0–4)=18 | 0(D5=0) | 18(D5=1) | 0(D5=0) | 19(D5=1) | 18(D5=1) | 17(D5=1) | 0(D5=1) | 16(D5=0) |
|   | OLD DATA(ADR0–4)=19 | 0(D5=0) | 19(D5=1) | 0(D5=0) | 20(D5=1) | 19(D5=1) | 18(D5=1) | 0(D5=1) | 16(D5=0) |
| B | OLD DATA(ADR0–4)=20 | 22(D5=1) | 20(D5=1) | 18(D5=1) | 21(D5=1) | 20(D5=1) | 19(D5=1) | 0(D5=1) | 16(D5=0) |
|   | OLD DATA(ADR0–4)=21 | 0(D5=0) | 21(D5=1) | 0(D5=0) | 22(D5=1) | 21(D5=1) | 20(D5=1) | 0(D5=1) | 16(D5=0) |
| C | OLD DATA(ADR0–4)=22 | 0(D5=0) | 22(D5=1) | 0(D5=0) | 23(D5=1) | 22(D5=1) | 21(D5=1) | 0(D5=1) | 16(D5=0) |
|   | OLD DATA(ADR0–4)=23 | 0(D5=0) | 23(D5=1) | 0(D5=0) | 24(D5=1) | 23(D5=1) | 22(D5=1) | 0(D5=1) | 16(D5=0) |
|   | OLD DATA(ADR0–4)=24 | 28(D5=0) | 24(D5=1) | 20(D5=0) | 25(D5=1) | 24(D5=1) | 23(D5=1) | 0(D5=1) | 16(D5=0) |
|   | OLD DATA(ADR0–4)=25 | 0(D5=0) | 25(D5=1) | 0(D5=0) | 26(D5=1) | 25(D5=1) | 24(D5=1) | 0(D5=1) | 16(D5=0) |
|   | OLD DATA(ADR0–4)=26 | 0(D5=0) | 26(D5=1) | 0(D5=0) | 27(D5=1) | 26(D5=1) | 25(D5=1) | 0(D5=1) | 16(D5=0) |
|   | OLD DATA(ADR0–4)=27 | 0(D5=0) | 27(D5=1) | 0(D5=0) | 28(D5=1) | 27(D5=1) | 26(D5=1) | 0(D5=1) | 16(D5=0) |
|   | OLD DATA(ADR0–4)=28 | 30(D5=1) | 28(D5=1) | 26(D5=1) | 29(D5=1) | 28(D5=1) | 27(D5=1) | 0(D5=1) | 16(D5=0) |
|   | OLD DATA(ADR0–4)=29 | 0(D5=0) | 29(D5=1) | 0(D5=0) | 30(D5=1) | 29(D5=1) | 28(D5=1) | 0(D5=1) | 16(D5=0) |
|   | OLD DATA(ADR0–4)=30 | 0(D5=0) | 30(D5=1) | 0(D5=0) | 31(D5=1) | 30(D5=1) | 29(D5=1) | 0(D5=1) | 16(D5=0) |

TABLE I-continued

|  |  |  |  |  |  |  | (i) | (ii) |
|---|---|---|---|---|---|---|---|---|
| BLM (ADR8) | 0 | 0 | 0 | 0 | 0 | 0 | ↓ 1 | ↓ 1 |
| COMP B(ADR6) | 0 | 1 | 1 | 0 | 1 | 1 | X | X |
| COMP A(ADR7) | 0 | 0 | 1 | 0 | 0 | 1 | X | X |
| UD/SA (ADR5) | 0 | 0 | 0 | 1 | 1 | 1 | 0 | 1 |
| OLD DATA(ADR0—4)=31 | 0(D5=0) | 31(D5=1) | 0(D5=0) | 31(D5=1) | 31(D5=1) | 30(D5=1) | 0(D5=1) | 16(D5=0) |

In Table I, COMPA (ADR7) and COMPB (ADR6) show the states of the Q outputs of the flip-flops 40 and 41, respectively, which respond to the outputs of the comparators COMPA and COMPB, respectively. That is, when both of these outputs are "0", it indicates a case where the accumulating time is too short and the image signal is at an insufficient level, and when both of these outputs are "1", it indicates a case where the accumulating time is too long and the image signal is saturated. COMPB="1" and COMPA="0" indicate that a proper image signal is obtained. UD/SA (ADR5) represents the discrimination between the successive approximation mode and the follow-up control mode, "0" represents the successive approximation mode, and "1" represents the follow-up control mode. BLOOM (ADR8) represents the presence or absence of the occurrence of blooming, BLM=1 represents the occurrence of blooming, and BLM=0 represents the non-occurrence of blooming. OLD DATA (ADR0–4)=i (i=0, 1, 2, ..., 31) in each line corresponds to the state of the inputs $A_0$–$A_4$ of the ROM 22, namely, the accumulating time set by the previous strobe of accumulating time renewal, and a suitable length of accumulating time corresponds to each i as a longer accumulating time is i is greater. The data of each line and row indicates to which accumulating time the accumulating time should shift in accordance with the mode represented by the current data of COMPA and COMPB and UD/SA relative to the accumulating time condition set by the previous strobe. As regards D5="0" or D5="1" in the parentheses affixed to said data, the former shows the command for holding the successive approximation mode and the latter shows the command for shifting to the follow-up control mode. First, the operation when BLM=0, i.e., during non-occurrence of blooming, will be described. When, at the start of operation of the system, the power up clear signal PUC is imparted to the D-flip-flop set 44, all of the inputs $A_0$–$A_4$ assume "0" (the first column OLD DATA (ADR0–4)=0). In this state, $D_5$="0" and therefore, the successive approximation mode dominates by all means. Irrespective of the states of COMPA and COMPB, the accumulating time is prolonged to "16" in the next strobe while the successive approximation mode remains dominant (arrow A). If, in this state, COMPA=-COMPB ="0", that is, if the accumulating time is too short, the accumulating time is prolonged to "24" in the next strobe (arrow B). Thus, in such a case, the accumulating time is not prolonged step by step, but it skips to the middle of all steps (32) and then shifts one half toward the longer side from the middle, namely, to "24". If, in the next strobe, COMPA=COMPB="1", that is, the accumulating time becomes too long, the accumulating time is set to "20" in the next strobe (arrow C). This is the medium of the previous cycle ("24") and the further previous cycle ("16"), and the accumulating time is controlled in the fashion of successive approximation. If, in this state, COMPA="0" and COMPB="1", that is, an appropriate accumulating time is set, the accumulating time is also "20" in the next strobe and D5="1", and thus the mode shifts to the follow-up control mode. Once the mode has shifted to the follow-up control mode, the accumulating time is thereafter controlled step by step in accordance with the combination of the outputs of the comparators COMPA and COMPB.

As will be seen from the foregoing, the successive approximation mode is a control method of gradually changing the set value toward an unknown proper value, so that the difference thereof from the unknown proper value becomes smaller, namely, changing the set value greatly at first and then gradually at a smaller range as the proper value is approached. The follow-up control mode is a step by step control method in which if COMPA="0" and COMPB="1", the set value is not changed as in the prior art, but when COMPA=-COMPB="0", the set value is increased by one step, that is, the accumulating time is prolonged by one step and when COMPA=COMPB="1", the set value is decreased by one step, that is, the accumulating time is shortened by one step.

The operation when blooming does not occur has been described above. That is, when blooming does not occur, the mode immediately shifts to the successive approximation mode by power up and, after a proper time value has been reached, the accumulating time is controlled by the follow-up control mode. The operation when BLM=1, that is, when blooming has occurred, will now be described with respect to:

(i) a case where BLM=1 during the successive approximation mode; and (ii) a case where BLM=1 during the follow-up control mode.

First, the case of (i) corresponds to the second column from the right end in Table I and in this case, as soon as BLM=1, the mode shifts to the follow-up control mode (D5=1) and the accumulating time unconditionally shifts to the shortest accumulating time. On the other hand, the case of (ii) corresponds to the rightmost column in Table I and as soon as BLM=1, the mode enters the successive approximation mode and the operation of unconditionally renewing the accumulating time setting from the initial state is performed. In the initial state, the value is "16" (middle), but this value can be determined to a suitable value (e.g., "8") in accordance with the conditions of the system. That is, the reason why "16" has been defined as the initial state is that the case where the initial period is too bright is taken into consideration, and it is simply because setting the initial value to a more or less short time is considered to be preferable. In that sense, the initial value is arbitrary.

The program of the ROM 43 required to obtain the control operation as described above is shown in Table II below.

TABLE II

| ADDRESS=0 | (000000000B) | DATA=16 | (010000B) |
|---|---|---|---|
| ADDRESS=1 | (000000001B) | DATA=0 | (000000B) |

TABLE II-continued

| ADDRESS | | DATA | |
|---|---|---|---|
| ADDRESS=2 | (000000010B) | DATA=0 | (000000B) |
| ADDRESS=3 | (000000011B) | DATA=0 | (000000B) |
| ADDRESS=4 | (000000100B) | DATA=38 | (100110B) |
| ADDRESS=5 | (000000101B) | DATA=0 | (000000B) |
| ADDRESS=6 | (000000110B) | DATA=0 | (000000B) |
| ADDRESS=7 | (000000111B) | DATA=0 | (000000B) |
| ADDRESS=8 | (000001000B) | DATA=12 | (001100B) |
| ADDRESS=9 | (000001001B) | DATA=0 | (000000B) |
| ADDRESS=10 | (000001010B) | DATA=0 | (000000B) |
| ADDRESS=11 | (000001011B) | DATA=0 | (000000B) |
| ADDRESS=12 | (000001100B) | DATA=46 | (101110B) |
| ADDRESS=13 | (000001101B) | DATA=0 | (000000B) |
| ADDRESS=14 | (000001110B) | DATA=0 | (000000B) |
| ADDRESS=15 | (000001111B) | DATA=0 | (000000B) |
| ADDRESS=16 | (000010000B) | DATA=24 | (011000B) |
| ADDRESS=17 | (000010001B) | DATA=0 | (000000B) |
| ADDRESS=18 | (000010010B) | DATA=0 | (000000B) |
| ADDRESS=19 | (000010011B) | DATA=0 | (000000B) |
| ADDRESS=20 | (000010100B) | DATA=54 | (110110B) |
| ADDRESS=21 | (000010101B) | DATA=0 | (000000B) |
| ADDRESS=22 | (000010110B) | DATA=0 | (000000B) |
| ADDRESS=23 | (000010111B) | DATA=0 | (000000B) |
| ADDRESS=24 | (000011000B) | DATA=28 | (011100B) |
| ADDRESS=25 | (000011001B) | DATA=0 | (000000B) |
| ADDRESS=26 | (000011010B) | DATA=0 | (000000B) |
| ADDRESS=27 | (000011011B) | DATA=0 | (000000B) |
| ADDRESS=28 | (000011100B) | DATA=62 | (111110B) |
| ADDRESS=29 | (000011101B) | DATA=0 | (000000B) |
| ADDRESS=30 | (000011110B) | DATA=0 | (000000B) |
| ADDRESS=31 | (000011111B) | DATA=0 | (000000B) |
| ADDRESS=32 | (000100000B) | DATA=33 | (100001B) |
| ADDRESS=33 | (000100001B) | DATA=34 | (100010B) |
| ADDRESS=34 | (000100010B) | DATA=35 | (100011B) |
| ADDRESS=35 | (000100011B) | DATA=36 | (100100B) |
| ADDRESS=36 | (000100100B) | DATA=37 | (100101B) |
| ADDRESS=37 | (000100101B) | DATA=38 | (100110B) |
| ADDRESS=38 | (000100110B) | DATA=39 | (100111B) |
| ADDRESS=39 | (000100111B) | DATA=40 | (101000B) |
| ADDRESS=40 | (000101000B) | DATA=41 | (101001B) |
| ADDRESS=41 | (000101001B) | DATA=42 | (101010B) |
| ADDRESS=42 | (000101010B) | DATA=43 | (101011B) |
| ADDRESS=43 | (000101011B) | DATA=44 | (101100B) |
| ADDRESS=44 | (000101100B) | DATA=45 | (101101B) |
| ADDRESS=45 | (000101101B) | DATA=46 | (101110B) |
| ADDRESS=46 | (000101110B) | DATA=47 | (101111B) |
| ADDRESS=47 | (000101111B) | DATA=48 | (110000B) |
| ADDRESS=48 | (000110000B) | DATA=49 | (110001B) |
| ADDRESS=49 | (000110001B) | DATA=50 | (110010B) |
| ADDRESS=50 | (000110010B) | DATA=51 | (110011B) |
| ADDRESS=51 | (000110011B) | DATA=52 | (110100B) |
| ADDRESS=52 | (000110100B) | DATA=53 | (110101B) |
| ADDRESS=53 | (000110101B) | DATA=54 | (110110B) |
| ADDRESS=54 | (000110110B) | DATA=55 | (110111B) |
| ADDRESS=55 | (000110111B) | DATA=56 | (111000B) |
| ADDRESS=56 | (000111000B) | DATA=57 | (111001B) |
| ADDRESS=57 | (000111001B) | DATA=58 | (111010B) |
| ADDRESS=58 | (000111010B) | DATA=59 | (111011B) |
| ADDRESS=59 | (000111011B) | DATA=60 | (111100B) |
| ADDRESS=60 | (000111100B) | DATA=61 | (111101B) |
| ADDRESS=61 | (000111101B) | DATA=62 | (111110B) |
| ADDRESS=62 | (000111110B) | DATA=63 | (111111B) |
| ADDRESS=63 | (000111111B) | DATA=64 | (111111B) |
| ADDRESS=64 | (001000000B) | DATA=16 | (010000B) |
| ADDRESS=65 | (001000001B) | DATA=33 | (100001B) |
| ADDRESS=66 | (001000010B) | DATA=34 | (100010B) |
| ADDRESS=67 | (001000011B) | DATA=35 | (100011B) |
| ADDRESS=68 | (001000100B) | DATA=36 | (100100B) |
| ADDRESS=69 | (001000101B) | DATA=37 | (100101B) |
| ADDRESS=70 | (001000110B) | DATA=38 | (100110B) |
| ADDRESS=71 | (001000111B) | DATA=39 | (100111B) |
| ADDRESS=72 | (001001000B) | DATA=40 | (101000B) |
| ADDRESS=73 | (001001001B) | DATA=41 | (101001B) |
| ADDRESS=74 | (001001010B) | DATA=42 | (101010B) |
| ADDRESS=75 | (001001011B) | DATA=43 | (101011B) |
| ADDRESS=76 | (001001100B) | DATA=44 | (101100B) |
| ADDRESS=77 | (001001101B) | DATA=45 | (101101B) |
| ADDRESS=78 | (001001110B) | DATA=46 | (101110B) |
| ADDRESS=79 | (001001111B) | DATA=47 | (101111B) |
| ADDRESS=80 | (001010000B) | DATA=48 | (110000B) |
| ADDRESS=81 | (001010001B) | DATA=49 | (110001B) |
| ADDRESS=82 | (001010010B) | DATA=50 | (110010B) |
| ADDRESS=83 | (001010011B) | DATA=51 | (110011B) |
| ADDRESS=84 | (001010100B) | DATA=52 | (110100B) |
| ADDRESS=85 | (001010101B) | DATA=53 | (110101B) |
| ADDRESS=86 | (001010110B) | DATA=54 | (110110B) |
| ADDRESS=87 | (001010111B) | DATA=55 | (110111B) |
| ADDRESS=88 | (001011000B) | DATA=56 | (111000B) |
| ADDRESS=89 | (001011001B) | DATA=57 | (111001B) |
| ADDRESS=90 | (001011010B) | DATA=58 | (111010B) |
| ADDRESS=91 | (001011011B) | DATA=59 | (111011B) |
| ADDRESS=92 | (001011100B) | DATA=60 | (111100B) |
| ADDRESS=93 | (001011101B) | DATA=61 | (111101B) |
| ADDRESS=94 | (001011110B) | DATA=62 | (111110B) |
| ADDRESS=95 | (001011111B) | DATA=63 | (111111B) |
| ADDRESS=96 | (001100000B) | DATA=32 | (100000B) |
| ADDRESS=97 | (001100001B) | DATA=33 | (100001B) |
| ADDRESS=98 | (001100010B) | DATA=34 | (100010B) |
| ADDRESS=99 | (001100011B) | DATA=35 | (100011B) |
| ADDRESS=100 | (001100100B) | DATA=36 | (100100B) |
| ADDRESS=101 | (001100101B) | DATA=37 | (100101B) |
| ADDRESS=102 | (001100110B) | DATA=38 | (100110B) |
| ADDRESS=103 | (001100111B) | DATA=39 | (100111B) |
| ADDRESS=104 | (001101000B) | DATA=40 | (101000B) |
| ADDRESS=105 | (001101001B) | DATA=41 | (101001B) |
| ADDRESS=106 | (001101010B) | DATA=42 | (101010B) |
| ADDRESS=107 | (001101011B) | DATA=43 | (101011B) |
| ADDRESS=108 | (001101100B) | DATA=44 | (101100B) |
| ADDRESS=109 | (001101101B) | DATA=45 | (101101B) |
| ADDRESS=110 | (001101110B) | DATA=46 | (101110B) |
| ADDRESS=111 | (001101111B) | DATA=47 | (101111B) |
| ADDRESS=112 | (001110000B) | DATA=48 | (110000B) |
| ADDRESS=113 | (001110001B) | DATA=49 | (110001B) |
| ADDRESS=114 | (001110010B) | DATA=50 | (110010B) |
| ADDRESS=115 | (001110011B) | DATA=51 | (110011B) |
| ADDRESS=116 | (001110100B) | DATA=52 | (110100B) |
| ADDRESS=117 | (001110101B) | DATA=53 | (110101B) |
| ADDRESS=118 | (001110110B) | DATA=54 | (110110B) |
| ADDRESS=119 | (001110111B) | DATA=55 | (110111B) |
| ADDRESS=120 | (001111000B) | DATA=56 | (111000B) |
| ADDRESS=121 | (001111001B) | DATA=57 | (111001B) |
| ADDRESS=122 | (001111010B) | DATA=58 | (111010B) |
| ADDRESS=123 | (001111011B) | DATA=59 | (111011B) |
| ADDRESS=124 | (001111100B) | DATA=60 | (111100B) |
| ADDRESS=125 | (001111101B) | DATA=61 | (111101B) |
| ADDRESS=126 | (001111110B) | DATA=62 | (111110B) |
| ADDRESS=127 | (001111111B) | DATA=63 | (111111B) |
| ADDRESS=128 | (010000000B) | DATA=0 | (000000B) |
| ADDRESS=129 | (010000001B) | DATA=0 | (000000B) |
| ADDRESS=130 | (010000010B) | DATA=0 | (000000B) |
| ADDRESS=131 | (010000011B) | DATA=0 | (000000B) |
| ADDRESS=132 | (010000100B) | DATA=0 | (000000B) |
| ADDRESS=133 | (010000101B) | DATA=0 | (000000B) |
| ADDRESS=134 | (010000110B) | DATA=0 | (000000B) |
| ADDRESS=135 | (010000111B) | DATA=0 | (000000B) |
| ADDRESS=136 | (010001000B) | DATA=0 | (000000B) |
| ADDRESS=137 | (010001001B) | DATA=0 | (000000B) |
| ADDRESS=138 | (010001010B) | DATA=0 | (000000B) |
| ADDRESS=139 | (010001011B) | DATA=0 | (000000B) |
| ADDRESS=140 | (010001100B) | DATA=0 | (000000B) |
| ADDRESS=141 | (010001101B) | DATA=0 | (000000B) |
| ADDRESS=142 | (010001110B) | DATA=0 | (000000B) |
| ADDRESS=143 | (010001111B) | DATA=0 | (000000B) |
| ADDRESS=144 | (010010000B) | DATA=0 | (000000B) |
| ADDRESS=145 | (010010001B) | DATA=0 | (000000B) |
| ADDRESS=146 | (010010010B) | DATA=0 | (000000B) |
| ADDRESS=147 | (010010011B) | DATA=0 | (000000B) |
| ADDRESS=148 | (010010100B) | DATA=0 | (000000B) |
| ADDRESS=149 | (010010101B) | DATA=0 | (000000B) |
| ADDRESS=150 | (010010110B) | DATA=0 | (000000B) |
| ADDRESS=151 | (010010111B) | DATA=0 | (000000B) |
| ADDRESS=152 | (010011000B) | DATA=0 | (000000B) |
| ADDRESS=153 | (010011001B) | DATA=0 | (000000B) |
| ADDRESS=154 | (010011010B) | DATA=0 | (000000B) |
| ADDRESS=155 | (010011011B) | DATA=0 | (000000B) |
| ADDRESS=156 | (010011100B) | DATA=0 | (000000B) |
| ADDRESS=157 | (010011101B) | DATA=0 | (000000B) |
| ADDRESS=158 | (010011110B) | DATA=0 | (000000B) |
| ADDRESS=159 | (010011111B) | DATA=0 | (000000B) |
| ADDRESS=160 | (010100000B) | DATA=0 | (000000B) |
| ADDRESS=161 | (010100001B) | DATA=0 | (000000B) |
| ADDRESS=162 | (010100010B) | DATA=0 | (000000B) |
| ADDRESS=163 | (010100011B) | DATA=0 | (000000B) |
| ADDRESS=164 | (010100100B) | DATA=0 | (000000B) |
| ADDRESS=165 | (010100101B) | DATA=0 | (000000B) |

TABLE II-continued

| ADDRESS | | DATA | |
|---|---|---|---|
| ADDRESS=166 | (010100110B) | DATA=0 | (000000B) |
| ADDRESS=167 | (010100111B) | DATA=0 | (000000B) |
| ADDRESS=168 | (010101000B) | DATA=0 | (000000B) |
| ADDRESS=169 | (010101001B) | DATA=0 | (000000B) |
| ADDRESS=170 | (010101010B) | DATA=0 | (000000B) |
| ADDRESS=171 | (010101011B) | DATA=0 | (000000B) |
| ADDRESS=172 | (010101100B) | DATA=0 | (000000B) |
| ADDRESS=173 | (010101101B) | DATA=0 | (000000B) |
| ADDRESS=174 | (010101110B) | DATA=0 | (000000B) |
| ADDRESS=175 | (010101111B) | DATA=0 | (000000B) |
| ADDRESS=176 | (010110000B) | DATA=0 | (000000B) |
| ADDRESS=177 | (010110001B) | DATA=0 | (000000B) |
| ADDRESS=178 | (010110010B) | DATA=0 | (000000B) |
| ADDRESS=179 | (010110011B) | DATA=0 | (000000B) |
| ADDRESS=180 | (010110100B) | DATA=0 | (000000B) |
| ADDRESS=181 | (010110101B) | DATA=0 | (000000B) |
| ADDRESS=182 | (010110110B) | DATA=0 | (000000B) |
| ADDRESS=183 | (010110111B) | DATA=0 | (000000B) |
| ADDRESS=184 | (010111000B) | DATA=0 | (000000B) |
| ADDRESS=185 | (010111001B) | DATA=0 | (000000B) |
| ADDRESS=186 | (010111010B) | DATA=0 | (000000B) |
| ADDRESS=187 | (010111011B) | DATA=0 | (000000B) |
| ADDRESS=188 | (010111100B) | DATA=0 | (000000B) |
| ADDRESS=189 | (010111101B) | DATA=0 | (000000B) |
| ADDRESS=190 | (010111110B) | DATA=0 | (000000B) |
| ADDRESS=191 | (010111111B) | DATA=0 | (000000B) |
| ADDRESS=192 | (011000000B) | DATA=16 | (010000B) |
| ADDRESS=193 | (011000001B) | DATA=0 | (000000B) |
| ADDRESS=194 | (011000010B) | DATA=0 | (000000B) |
| ADDRESS=195 | (011000011B) | DATA=0 | (000000B) |
| ADDRESS=196 | (011000100B) | DATA=34 | (100010B) |
| ADDRESS=197 | (011000101B) | DATA=0 | (000000B) |
| ADDRESS=198 | (011000110B) | DATA=0 | (000000B) |
| ADDRESS=199 | (011000111B) | DATA=0 | (000000B) |
| ADDRESS=200 | (011001000B) | DATA=4 | (000100B) |
| ADDRESS=201 | (011001001B) | DATA=0 | (000000B) |
| ADDRESS=202 | (011001010B) | DATA=0 | (000000B) |
| ADDRESS=203 | (011001011B) | DATA=0 | (000000B) |
| ADDRESS=204 | (011001100B) | DATA=42 | (101010B) |
| ADDRESS=205 | (011001101B) | DATA=0 | (000000B) |
| ADDRESS=206 | (011001110B) | DATA=0 | (000000B) |
| ADDRESS=207 | (011001111B) | DATA=0 | (000000B) |
| ADDRESS=208 | (011010000B) | DATA=8 | (001000B) |
| ADDRESS=209 | (011010001B) | DATA=0 | (000000B) |
| ADDRESS=210 | (011010010B) | DATA=0 | (000000B) |
| ADDRESS=211 | (011010011B) | DATA=0 | (000000B) |
| ADDRESS=212 | (011010100B) | DATA=50 | (110010B) |
| ADDRESS=213 | (011010101B) | DATA=0 | (000000B) |
| ADDRESS=214 | (011010101B) | DATA=0 | (000000B) |
| ADDRESS=215 | (011010111B) | DATA=0 | (000000B) |
| ADDRESS=216 | (011011000B) | DATA=20 | (010100B) |
| ADDRESS=217 | (011011001B) | DATA=0 | (000000B) |
| ADDRESS=218 | (011011010B) | DATA=0 | (000000B) |
| ADDRESS=219 | (011011011B) | DATA=0 | (000000B) |
| ADDRESS=220 | (011011100B) | DATA=58 | (111010B) |
| ADDRESS=221 | (011011101B) | DATA=0 | (000000B) |
| ADDRESS=222 | (011011110B) | DATA=0 | (000000B) |
| ADDRESS=223 | (011011111B) | DATA=0 | (000000B) |
| ADDRESS=224 | (011100000B) | DATA=32 | (100000B) |
| ADDRESS=225 | (011100001B) | DATA=32 | (100000B) |
| ADDRESS=226 | (011100010B) | DATA=33 | (100001B) |
| ADDRESS=227 | (011100011B) | DATA=34 | (100010B) |
| ADDRESS=228 | (011100100B) | DATA=35 | (100011B) |
| ADDRESS=229 | (011100101B) | DATA=36 | (100100B) |
| ADDRESS=230 | (011100110B) | DATA=37 | (100101B) |
| ADDRESS=231 | (011100111B) | DATA=38 | (100110B) |
| ADDRESS=232 | (011101000B) | DATA=39 | (100111B) |
| ADDRESS=233 | (011101001B) | DATA=40 | (101000B) |
| ADDRESS=234 | (011101010B) | DATA=41 | (101001B) |
| ADDRESS=235 | (011101011B) | DATA=42 | (101010B) |
| ADDRESS=236 | (011101100B) | DATA=43 | (101011B) |
| ADDRESS=237 | (011101101B) | DATA=44 | (101100B) |
| ADDRESS=238 | (011101110B) | DATA=45 | (101101B) |
| ADDRESS=239 | (011101111B) | DATA=46 | (101110B) |
| ADDRESS=240 | (011110000B) | DATA=47 | (101111B) |
| ADDRESS=241 | (011110001B) | DATA=48 | (110000B) |
| ADDRESS=242 | (011110010B) | DATA=49 | (110001B) |
| ADDRESS=243 | (011110011B) | DATA=50 | (110010B) |
| ADDRESS=244 | (011110100B) | DATA=51 | (110011B) |
| ADDRESS=245 | (011110101B) | DATA=52 | (110100B) |
| ADDRESS=246 | (011110110B) | DATA=53 | (110101B) |
| ADDRESS=247 | (011110111B) | DATA=54 | (110110B) |
| ADDRESS=248 | (011111000B) | DATA=55 | (110111B) |
| ADDRESS=249 | (011111001B) | DATA=56 | (111000B) |
| ADDRESS=250 | (011111010B) | DATA=57 | (111001B) |
| ADDRESS=251 | (011111011B) | DATA=58 | (111010B) |
| ADDRESS=252 | (011111100B) | DATA=59 | (111011B) |
| ADDRESS=253 | (011111101B) | DATA=60 | (111100B) |
| ADDRESS=254 | (011111110B) | DATA=61 | (111101B) |
| ADDRESS=255 | (011111111B) | DATA=62 | (111110B) |
| ADDRESS=256 | (100000000B) | DATA=32 | (100000B) |
| ADDRESS=257 | (100000001B) | DATA=32 | (100000B) |
| ADDRESS=258 | (100000010B) | DATA=32 | (100000B) |
| ADDRESS=259 | (100000011B) | DATA=32 | (100000B) |
| ADDRESS=260 | (100000100B) | DATA=32 | (100000B) |
| ADDRESS=261 | (100000101B) | DATA=32 | (100000B) |
| ADDRESS=262 | (100000110B) | DATA=32 | (100000B) |
| ADDRESS=263 | (100000111B) | DATA=32 | (100000B) |
| ADDRESS=264 | (100001000B) | DATA=32 | (100000B) |
| ADDRESS=265 | (100001001B) | DATA=32 | (100000B) |
| ADDRESS=266 | (100001010B) | DATA=32 | (100000B) |
| ADDRESS=267 | (100001011B) | DATA=32 | (100000B) |
| ADDRESS=268 | (100001100B) | DATA=32 | (100000B) |
| ADDRESS=269 | (100001101B) | DATA=32 | (100000B) |
| ADDRESS=270 | (100001110B) | DATA=32 | (100000B) |
| ADDRESS=271 | (100001111B) | DATA=32 | (100000B) |
| ADDRESS=272 | (100010000B) | DATA=32 | (100000B) |
| ADDRESS=273 | (100010001B) | DATA=32 | (100000B) |
| ADDRESS=274 | (100010010B) | DATA=32 | (100000B) |
| ADDRESS=275 | (100010011B) | DATA=32 | (100000B) |
| ADDRESS=276 | (100010100B) | DATA=32 | (100000B) |
| ADDRESS=277 | (100010101B) | DATA=32 | (100000B) |
| ADDRESS=278 | (100010110B) | DATA=32 | (100000B) |
| ADDRESS=279 | (100010111B) | DATA=32 | (100000B) |
| ADDRESS=280 | (100011000B) | DATA=32 | (100000B) |
| ADDRESS=281 | (100011001B) | DATA=32 | (100000B) |
| ADDRESS=282 | (100011010B) | DATA=32 | (100000B) |
| ADDRESS=283 | (100011011B) | DATA=32 | (100000B) |
| ADDRESS=284 | (100011100B) | DATA=32 | (100000B) |
| ADDRESS=285 | (100011101B) | DATA=32 | (100000B) |
| ADDRESS=286 | (100011110B) | DATA=32 | (100000B) |
| ADDRESS=287 | (100011111B) | DATA=32 | (100000B) |
| ADDRESS=288 | (100100000B) | DATA=16 | (010000B) |
| ADDRESS=289 | (100100001B) | DATA=16 | (010000B) |
| ADDRESS=290 | (100100010B) | DATA=16 | (010000B) |
| ADDRESS=291 | (100100011B) | DATA=16 | (010000B) |
| ADDRESS=292 | (100100100B) | DATA=16 | (010000B) |
| ADDRESS=293 | (100100101B) | DATA=16 | (010000B) |
| ADDRESS=294 | (100100110B) | DATA=16 | (010000B) |
| ADDRESS=295 | (100100111B) | DATA=16 | (010000B) |
| ADDRESS=296 | (100101000B) | DATA=16 | (010000B) |
| ADDRESS=297 | (100101001B) | DATA=16 | (010000B) |
| ADDRESS=298 | (100101010B) | DATA=16 | (010000B) |
| ADDRESS=299 | (100101011B) | DATA=16 | (010000B) |
| ADDRESS=300 | (100101100B) | DATA=16 | (010000B) |
| ADDRESS=301 | (100101101B) | DATA=16 | (010000B) |
| ADDRESS=302 | (100101110B) | DATA=16 | (010000B) |
| ADDRESS=303 | (100101111B) | DATA=16 | (010000B) |
| ADDRESS=304 | (100110000B) | DATA=16 | (010000B) |
| ADDRESS=305 | (100110001B) | DATA=16 | (010000B) |
| ADDRESS=306 | (100110010B) | DATA=16 | (010000B) |
| ADDRESS=307 | (100110011B) | DATA=16 | (010000B) |
| ADDRESS=308 | (100110100B) | DATA=16 | (010000B) |
| ADDRESS=309 | (100110101B) | DATA=16 | (010000B) |
| ADDRESS=310 | (100110110B) | DATA=16 | (010000B) |
| ADDRESS=311 | (100110111B) | DATA=16 | (010000B) |
| ADDRES5=312 | (100111000B) | DATA=16 | (010000B) |
| ADDRESS=313 | (100111001B) | DATA=16 | (010000B) |
| ADDRESS=314 | (100111010B) | DATA=16 | (010000B) |
| ADDRESS=315 | (100111011B) | DATA=16 | (010000B) |
| ADDRESS=316 | (100111100B) | DATA=16 | (010000B) |
| ADDRESS=317 | (100111101B) | DATA=16 | (010000B) |
| ADDRESS=318 | (100111110B) | DATA=16 | (010000B) |
| ADDRESS=319 | (100111111B) | DATA=16 | (010000B) |
| ADDRESS=320 | (101000000B) | DATA=16 | (010000B) |
| ADDRESS=321 | (101000001B) | DATA=32 | (100000B) |
| ADDRESS=322 | (101000010B) | DATA=32 | (100000B) |
| ADDRESS=323 | (101000011B) | DATA=32 | (100000B) |
| ADDRESS=324 | (101000100B) | DATA=32 | (100000B) |
| ADDRESS=325 | (101000101B) | DATA=32 | (100000B) |
| ADDRESS=326 | (101000110B) | DATA=32 | (100000B) |
| ADDRESS=327 | (101000111B) | DATA=32 | (100000B) |
| ADDRESS=328 | (101001000B) | DATA=32 | (100000B) |
| ADDRESS=329 | (101001001B) | DATA=32 | (100000B) |

TABLE II-continued

| | | |
|---|---|---|
| ADDRESS=330 | (101001010B) | DATA=32 (100000B) |
| ADDRESS=331 | (101001011B) | DATA=32 (100000B) |
| ADDRESS=332 | (101001100B) | DATA=32 (100000B) |
| ADDRESS=333 | (101001101B) | DATA=32 (100000B) |
| ADDRESS=334 | (101001110B) | DATA=32 (100000B) |
| ADDRESS=335 | (101001111B) | DATA=32 (100000B) |
| ADDRESS=336 | (101010000B) | DATA=32 (100000B) |
| ADDRESS=337 | (101010001B) | DATA=32 (100000B) |
| ADDRESS=338 | (101010010B) | DATA=32 (100000B) |
| ADDRESS=339 | (101010011B) | DATA=32 (100000B) |
| ADDRESS=340 | (101010100B) | DATA=32 (100000B) |
| ADDRESS=341 | (101010101B) | DATA=32 (100000B) |
| ADDRESS=342 | (101010110B) | DATA=32 (100000B) |
| ADDRESS=343 | (101010111B) | DATA=32 (100000B) |
| ADDRESS=344 | (101011000B) | DATA=32 (100000B) |
| ADDRESS=345 | (101011001B) | DATA=32 (100000B) |
| ADDRESS=346 | (101011010B) | DATA=32 (100000B) |
| ADDRESS=347 | (101011011B) | DATA=32 (100000B) |
| ADDRESS=348 | (101011100B) | DATA=32 (100000B) |
| ADDRESS=349 | (101011101B) | DATA=32 (100000B) |
| ADDRESS=350 | (101011110B) | DATA=32 (100000B) |
| ADDRESS=351 | (101011111B) | DATA=32 (100000B) |
| ADDRESS=352 | (101100000B) | DATA=16 (010000B) |
| ADDRESS=353 | (101100001B) | DATA=16 (010000B) |
| ADDRESS=354 | (101100010B) | DATA=16 (010000B) |
| ADDRESS=355 | (101100011B) | DATA=16 (010000B) |
| ADDRESS=356 | (101100100B) | DATA=16 (010000B) |
| ADDRESS=357 | (101100101B) | DATA=16 (010000B) |
| ADDRESS=358 | (101100110B) | DATA=16 (010000B) |
| ADDRESS=359 | (101100111B) | DATA=16 (010000B) |
| ADDRESS=360 | (101101000B) | DATA=16 (010000B) |
| ADDRESS=361 | (101101001B) | DATA=16 (010000B) |
| ADDRESS=362 | (101101010B) | DATA=16 (010000B) |
| ADDRESS=363 | (101101011B) | DATA=16 (010000B) |
| ADDRESS=364 | (101101100B) | DATA=16 (010000B) |
| ADDRESS=365 | (101101101B) | DATA=16 (010000B) |
| ADDRESS=366 | (101101110B) | DATA=16 (010000B) |
| ADDRESS=367 | (101101111B) | DATA=16 (010000B) |
| ADDRESS=368 | (101110000B) | DATA=16 (010000B) |
| ADDRESS=369 | (101110001B) | DATA=16 (010000B) |
| ADDRESS=370 | (101110010B) | DATA=16 (010000B) |
| ADDRESS=371 | (101110011B) | DATA=16 (010000B) |
| ADDRESS=372 | (101110100B) | DATA=16 (010000B) |
| ADDRESS=373 | (101110101B) | DATA=16 (010000B) |
| ADDRESS=374 | (101110110B) | DATA=16 (010000B) |
| ADDRESS=375 | (101110111B) | DATA=16 (010000B) |
| ADDRESS=376 | (101111000B) | DATA=16 (010000B) |
| ADDRESS=377 | (101111001B) | DATA=16 (010000B) |
| ADDRESS=378 | (101111010B) | DATA=16 (010000B) |
| ADDRESS=379 | (101111011B) | DATA=16 (010000B) |
| ADDRESS=380 | (101111100B) | DATA=16 (010000B) |
| ADDRESS=381 | (101111101B) | DATA=16 (010000B) |
| ADDRESS=382 | (101111110B) | DATA=16 (010000B) |
| ADDRESS=383 | (101111111B) | DATA=16 (010000B) |
| ADDRESS=384 | (110000000B) | DATA=0 (000000B) |
| ADDRESS=385 | (110000001B) | DATA=0 (000000B) |
| ADDRESS=386 | (110000010B) | DATA=0 (000000B) |
| ADDRESS=387 | (110000011B) | DATA=0 (000000B) |
| ADDRESS=388 | (110000100B) | DATA=0 (000000B) |
| ADDRESS=389 | (110000101B) | DATA=0 (000000B) |
| ADDRESS=390 | (110000110B) | DATA=0 (000000B) |
| ADDRESS=391 | (110000111B) | DATA=0 (000000B) |
| ADDRESS=392 | (110001000B) | DATA=0 (000000B) |
| ADDRESS=393 | (110001001B) | DATA=0 (000000B) |
| ADDRESS=394 | (110001010B) | DATA=0 (000000B) |
| ADDRESS=395 | (110001011B) | DATA=0 (000000B) |
| ADDRESS=396 | (110001100B) | DATA=0 (000000B) |
| ADDRESS=397 | (110001101B) | DATA=0 (000000B) |
| ADDRESS=398 | (110001110B) | DATA=0 (000000B) |
| ADDRESS=399 | (110001111B) | DATA=0 (000000B) |
| ADDRESS=400 | (110010000B) | DATA=0 (000000B) |
| ADDRESS=401 | (110010001B) | DATA=0 (000000B) |
| ADDRESS=402 | (110010010B) | DATA=0 (000000B) |
| ADDRESS=403 | (110010011B) | DATA=0 (000000B) |
| ADDRESS=404 | (110010100B) | DATA=0 (000000B) |
| ADDRESS=405 | (110010101B) | DATA=0 (000000B) |
| ADDRESS=406 | (110010110B) | DATA=0 (000000B) |
| ADDRESS=407 | (110010111B) | DATA=0 (000000B) |
| ADDRESS=408 | (110011000B) | DATA=0 (000000B) |
| ADDRESS=409 | (110011001B) | DATA=0 (000000B) |
| ADDRESS=410 | (110011010B) | DATA=0 (000000B) |
| ADDRESS=411 | (110011011B) | DATA=0 (000000B) |
| ADDRESS=412 | (110011100B) | DATA=0 (000000B) |
| ADDRESS=413 | (110011101B) | DATA=0 (000000B) |
| ADDRESS=414 | (110011110B) | DATA=0 (000000B) |
| ADDRESS=415 | (110011111B) | DATA=0 (000000B) |
| ADDRESS=416 | (110100000B) | DATA=0 (000000B) |
| ADDRESS=417 | (110100001B) | DATA=0 (000000B) |
| ADDRESS=418 | (110100010B) | DATA=0 (000000B) |
| ADDRESS=419 | (110100011B) | DATA=0 (000000B) |
| ADDRESS=420 | (110100100B) | DATA=0 (000000B) |
| ADDRESS=421 | (110100101B) | DATA=0 (000000B) |
| ADDRESS=422 | (110100110B) | DATA=0 (000000B) |
| ADDRESS=423 | (110100111B) | DATA=0 (000000B) |
| ADDRESS=424 | (110101000B) | DATA=0 (000000B) |
| ADDRESS=425 | (110101001B) | DATA=0 (000000B) |
| ADDRESS=426 | (110101010B) | DATA=0 (000000B) |
| ADDRESS=427 | (110101011B) | DATA=0 (000000B) |
| ADDRESS=428 | (110101100B) | DATA=0 (000000B) |
| ADDRESS=429 | (110101101B) | DATA=0 (000000B) |
| ADDRESS=430 | (110101110B) | DATA=0 (000000B) |
| ADDRESS=431 | (110101111B) | DATA=0 (000000B) |
| ADDRESS=432 | (110110000B) | DATA=0 (000000B) |
| ADDRESS=433 | (110110001B) | DATA=0 (000000B) |
| ADDRESS=434 | (110110010B) | DATA=0 (000000B) |
| ADDRESS=435 | (110110011B) | DATA=0 (000000B) |
| ADDRESS=436 | (110110100B) | DATA=0 (000000B) |
| ADDRESS=437 | (110110101B) | DATA=0 (000000B) |
| ADDRESS=438 | (110110110B) | DATA=0 (000000B) |
| ADDRESS=439 | (110110111B) | DATA=0 (000000B) |
| ADDRESS=440 | (110111000B) | DATA=0 (000000B) |
| ADDRESS=441 | (110111001B) | DATA=0 (000000B) |
| ADDRESS=442 | (110111010B) | DATA=0 (000000B) |
| ADDRESS=443 | (110111011B) | DATA=0 (000000B) |
| ADDRESS=444 | (110111100B) | DATA=0 (000000B) |
| ADDRESS=445 | (110111101B) | DATA=0 (000000B) |
| ADDRESS=446 | (110111110B) | DATA=0 (000000B) |
| ADDRESS=447 | (110111111B) | DATA=0 (000000B) |
| ADDRESS=448 | (111000000B) | DATA=32 (100000B) |
| ADDRESS=449 | (111000001B) | DATA=32 (100000B) |
| ADDRESS=450 | (111000010B) | DATA=32 (100000B) |
| ADDRESS=451 | (111000011B) | DATA=32 (100000B) |
| ADDRESS=452 | (111000100B) | DATA=32 (100000B) |
| ADDRESS=453 | (111000101B) | DATA=32 (100000B) |
| ADDRESS=454 | (111000110B) | DATA=32 (100000B) |
| ADDRESS=455 | (111000111B) | DATA=32 (100000B) |
| ADDRESS=456 | (111001000B) | DATA=32 (100000B) |
| ADDRESS=457 | (111001001B) | DATA=32 (100000B) |
| ADDRESS=458 | (111001010B) | DATA=32 (100000B) |
| ADDRESS=459 | (111001011B) | DATA=32 (100000B) |
| ADDRESS=460 | (111001100B) | DATA=32 (100000B) |
| ADDRESS=461 | (111001101B) | DATA=32 (100000B) |
| ADDRESS=462 | (111001110B) | DATA=32 (100000B) |
| ADDRESS=463 | (111001111B) | DATA=32 (100000B) |
| ADDRESS=464 | (111010000B) | DATA=32 (100000B) |
| ADDRESS=465 | (111010001B) | DATA=32 (100000B) |
| ADDRESS=466 | (111010010B) | DATA=32 (100000B) |
| ADDRESS=467 | (111010011B) | DATA=32 (100000B) |
| ADDRESS=468 | (111010100B) | DATA=32 (100000B) |
| ADDRESS=469 | (111010101B) | DATA=32 (100000B) |
| ADDRESS=470 | (111010110B) | DATA=32 (100000B) |
| ADDRESS=471 | (111010111B) | DATA=32 (100000B) |
| ADDRESS=472 | (111011000B) | DATA=32 (100000B) |
| ADDRESS=473 | (111011001B) | DATA=32 (100000B) |
| ADDRESS=474 | (111011010B) | DATA=32 (100000B) |
| ADDRESS=475 | (111011011B) | DATA=32 (100000B) |
| ADDRESS=476 | (111011100B) | DATA=32 (100000B) |
| ADDRESS=477 | (111011101B) | DATA=32 (100000B) |
| ADDRESS=478 | (111011110B) | DATA=32 (100000B) |
| ADDRESS=479 | (111011111B) | DATA=32 (100000B) |
| ADDRESS=480 | (111100000B) | DATA=16 (010000B) |
| ADDRESS=481 | (111100001B) | DATA=16 (010000B) |
| ADDRESS=482 | (111100010B) | DATA=16 (010000B) |
| ADDRESS=483 | (111100011B) | DATA=16 (010000B) |
| ADDRESS=484 | (111100100B) | DATA=16 (010000B) |
| ADDRESS=485 | (111100101B) | DATA=16 (010000B) |
| ADDRESS=486 | (111100110B) | DATA=16 (010000B) |
| ADDRESS=487 | (111100111B) | DATA=16 (010000B) |
| ADDRESS=488 | (111101000B) | DATA=16 (010000B) |
| ADDRESS=489 | (111101001B) | DATA=16 (010000B) |
| ADDRESS=490 | (111101010B) | DATA=16 (010000B) |
| ADDRESS=491 | (111101011B) | DATA=16 (010000B) |
| ADDRESS=492 | (111101100B) | DATA=16 (010000B) |
| ADDRESS=493 | (111101101B) | DATA=16 (010000B) |

TABLE II-continued

| ADDRESS=494 | (111101110B) | DATA=16 (010000B) |
| --- | --- | --- |
| ADDRESS=495 | (111101111B) | DATA=16 (010000B) |
| ADDRESS=496 | (111110000B) | DATA=16 (010000B) |
| ADDRESS=497 | (111110001B) | DATA=16 (010000B) |
| ADDRESS=498 | (111110010B) | DATA=16 (010000B) |
| ADDRESS=499 | (111110011B) | DATA=16 (010000B) |
| ADDRESS=500 | (111110100B) | DATA=16 (010000B) |
| ADDRESS=501 | (111110101B) | DATA=16 (010000B) |
| ADDRESS=502 | (111110110B) | DATA=16 (010000B) |
| ADDRESS=503 | (111110111B) | DATA=16 (010000B) |
| ADDRESS=504 | (111111000B) | DATA=16 (010000B) |
| ADDRESS=505 | (111111001B) | DATA=16 (010000B) |
| ADDRESS=506 | (111111010B) | DATA=16 (010000B) |
| ADDRESS=507 | (111111011B) | DATA=16 (010000B) |
| ADDRESS=508 | (111111100B) | DATA=16 (010000B) |
| ADDRESS=509 | (111111101B) | DATA=16 (010000B) |
| ADDRESS=510 | (111111110B) | DATA=16 (010000B) |
| ADDRESS=511 | (111111111B) | DATA=16 (010000B) |

From Tables I and II above, all the operation of the accumulating time control circuit AGC shown in FIG. 11 will be appreciated.

As described above in detail, according to the present invention, the time required until the right operation of the system is performed against the great fluctuation of the intensity of incident radiation can be shortened greatly as compared with the case where the accumulating time is prolonged or shortened on one step-by-one step basis, and a proper accumulating time can be reached in a very short time against said fluctuation of the radiation intensity, whereby the speed of operation of the system can be enhanced. While ROM has been used in the present embodiment, ROM need not always be used, but the present invention can also be realized by using, for example, PLA (programmable logic array) or a wired logic. Further, a similar method can also be realized by using a combination of a successive approximation register, Model No. 74LS502 manufactured by Texas Instruments Inc. and a presettable up-down counter designated Model No. 74LS161 of the same company.

While, in the present embodiment, a remarkable increase in the intensity of the light incident on the CCD 6 is discriminated by detecting the presence or absence of the phenomenon of blooming caused thereby in the CCD 6, it is of course possible to separately provide a conventional metering circuit for measuring the intensity of the light incident on the CCD 6, discriminate the remarkable increase in the intensity of the incident light by the output of the metering circuit and impart the result thereof to the input A8 of the ROM 43 of FIG. 11.

Although the present embodiment has been described by taking the case of a remarkable increase as an example of the remarkable change in the intensity of the incident light, the present invention is also effective for a remarkable decrease. More specifically, design may be made such that a remarkable decrease in the intensity of the incident light (which may of course include a remarkable increase) is discriminated, for example, by the output of the metering circuit as described above and the result thereof is imparted to the input A8 of the ROM 43 of FIG. 11 and accordingly, again in such a case, the construction of FIG. 11 can be intactly applied. Thus, the present invention is of course not restricted to the construction shown as the embodiment thereof, but various modifications may be made thereto within the scope of the spirit of the invention as defined in the appended claims.

What we claim is:
1. A radiation sensing system comprising:
   (A) accumulation type radiation sensing means which produces an electrical indication by accumulating incident radiation over a selected accumulation time;
   (B) detecting means for detecting a large change in the intensity of said incident radiation, said detecting means producing a characteristic output when it detects the intensity of the incident radiation; and
   (C) control means for controlling the accumulation time of said sensing means, said control means having first and second control modes different from each other and, in response to the characteristic output of said detecting means, changes an accumulation time control mode from one of said first and second control modes to the other, said control means, when operating in said second control mode, causes successive approximations, at different steps, of the accumulation time of said sensing means until a proper selected acccumulation time, among a plurality of different selected accumulation times, is reached such that the level of the electrical indication produced from said sensing means falls within a predetermined range.

2. The system according to claim 1, wherein said control means, when operating in said first control mode, causes change of the accumulation time of said sensing means on a step-by-step basis among said plurality of different selected accumulation times in accordance with the change in the intensity of the incident radiation until the level of the electrical indication produced from said sensing means falls within said predetermined range.

3. The system according to claim 1, wherein said control means, when operating in said first control mode, causes change of the accumulation time of said sensing means on a step-by-step basis among a plurality of different selected accumulation times in accordance with the change in the intensity of the incident radiation until the level of the electrical indication produced from said sensing means falls within a predetermined range.

4. The system according to claim 1, 2, or 3, further comprising:
   discrimination means for discriminating the level of said electrical indication produced from said sensing means, said discrimination means producing a first discrimination output when the level of said electrical indication is within said predetermined range and producing one of a second and a third discrimination output when the level of said electrical indication is outside said range;
   wherein said control means, in response to said first, second and third discrimination outputs of said discrimination means, controls the accumulation time of said sensing means in accordance with said first and second control modes to obtain a proper selected accumulation time, among said plurality of different selected accumulation times, such that said discrimination means produces said first discrimination output.

5. The system according to claim 4, wherein said detecting means produces said characteristic output when it detects a large increase in the intensity of said incident radiation.

6. The system according to claim 5, wherein said detecting means is coupled to said sensing means and produces said characteristic output when said detecting means detects blooming in said sensing means.

7. The system according to claim 4, further comprising:
initiation means for initiating the operation of the system;
wherein said control means, in response to said initiation means, starts the control of the accumulation time of said sensing means in accordance with said second control mode until said discrimination means produces said first discrimination output.

8. The system according to claim 7, wherein said control means includes a programmable Read-Only-Memory.

9. The system according to claim 1, wherein said detecting means produces said characteristic output when it detects a large increase in the intensity of said incident radiation.

10. The system according to claim 9, wherein said detecting means is coupled to said sensing means and produces said characteristic output when it detects blooming in said sensing means.

11. The system according to claim 1, 2, or 3, further comprising:
initiation means for initiating the operation of the system;
wherein said control means, in response to said intiation means, starts the control of the accumulation time of said sensing means in accordance with said second control mode until the level of the electrical indication produced from said sensing means fails within the predetermined range.

12. The system according to claim 11, wherein said control means includes a programmable Read-Only-Memory.

13. The system according to claim 4, wherein said control means includes a programmable Read-Only-Memory.

14. The system according to claim 1, wherein said control means includes a programmable Read-Only-Memory.

* * * * *

UNITED STATES PATENT AND TRADEMARK OFFICE
CERTIFICATE OF CORRECTION

PATENT NO. :   4,584,656
DATED      :   April 22, 1986
INVENTOR(S) :  SHINJI SAKAI, ET AL.

It is certified that error appears in the above-identified patent and that said Letters Patent is hereby corrected as shown below:

```
Column 1, line 64,  change "mode different from
                    each other modes" to --modes
                    different from each other--.

Column 4, line 52,  change "U.S." to --and U.S.--.

Column 9, line 56,  change "diode in" to --diode
                    LEDB in--.

Column 13, line 14, change "thd" to --the--.

Column 15, line 18, delete "much time".
```

UNITED STATES PATENT AND TRADEMARK OFFICE
CERTIFICATE OF CORRECTION

PATENT NO.   :   4,584,656          Page 2 of 3
DATED        :   April 22, 1986
INVENTOR(S)  :   SHINJI SAKAI, ET. AL.

It is certified that error appears in the above-identified patent and that said Letters Patent is hereby corrected as shown below:

Columns 15 and 16, Table I should appear as follows:

TABLE I

|  |  |  |  |  |  |  |  | (i) | (ii) |
|---|---|---|---|---|---|---|---|---|---|
| BLM (ADR8) | 0 | 0 | 0 | 0 | 0 | 0 | 1 | 1 |
| COMP B(ADR6) | 0 | 1 | 1 | 0 | 1 | 1 | X | X |
| COMP A(ADR7) | 0 | 0 | 1 | 0 | 0 | 1 | X | X |
| UD/SA (ADR5) | 0 | 0 | 0 | 1 | 1 | 1 | 0 | 1 |
| OLD DATA(ADR0–4)= 0 | 16(D5=0) | 16(D5=0) | 16(D5=0) | 1(D5=1) | 0(D5=1) | 0(D5=1) | 16(D5=0) |  |
| OLD DATA(ADR0–4)= 1 | 0(D5=0) | 1(D5=1) | 0(D5=0) | 2(D5=1) | 1(D5=1) | 0(D5=1) | 0(D5=1) | 16(D5=0) |
| OLD DATA(ADR0–4)= 2 | 0(D5=0) | 2(D5=1) | 0(D5=0) | 3(D5=1) | 2(D5=1) | 1(D5=1) | 0(D5=1) | 16(D5=0) |
| OLD DATA(ADR0–4)= 3 | 0(D5=0) | 3(D5=1) | 0(D5=0) | 4(D5=1) | 3(D5=1) | 2(D5=1) | 0(D5=1) | 16(D5=0) |
| OLD DATA(ADR0–4)= 4 | 6(D5=1) | 4(D5=1) | 2(D5=1) | 5(D5=1) | 4(D5=1) | 3(D5=1) | 0(D5=1) | 16(D5=0) |
| OLD DATA(ADR0–4)= 5 | 0(D5=0) | 5(D5=1) | 0(D5=0) | 6(D5=1) | 5(D5=1) | 4(D5=1) | 0(D5=1) | 16(D5=0) |
| OLD DATA(ADR0–4)= 6 | 0(D5=0) | 6(D5=1) | 0(D5=0) | 7(D5=1) | 6(D5=1) | 5(D5=1) | 0(D5=1) | 16(D5=0) |
| OLD DATA(ADR0–4)= 7 | 0(D5=0) | 7(D5=1) | 0(D5=0) | 8(D5=1) | 7(D5=1) | 6(D5=1) | 0(D5=1) | 16(D5=0) |
| OLD DATA(ADR0–4)= 8 | 12(D5=0) | 8(D5=1) | 4(D5=0) | 9(D5=1) | 8(D5=1) | 7(D5=1) | 0(D5=1) | 16(D5=0) |
| OLD DATA(ADR0–4)= 9 | 0(D5=0) | 9(D5=1) | 0(D5=0) | 10(D5=1) | 9(D5=1) | 8(D5=1) | 0(D5=1) | 16(D5=0) |
| OLD DATA(ADR0–4)=10 | 0(D5=0) | 10(D5=1) | 0(D5=0) | 11(D5=1) | 10(D5=1) | 9(D5=1) | 0(D5=1) | 16(D5=0) |
| OLD DATA(ADR0–4)=11 | 0(D5=0) | 11(D5=1) | 0(D5=0) | 12(D5=1) | 11(D5=1) | 10(D5=1) | 0(D5=1) | 16(D5=0) |
| OLD DATA(ADR0–4)=12 | 14(D5=1) | 12(D5=1) | 10(D5=1) | 13(D5=1) | 12(D5=1) | 11(D5=1) | 0(D5=1) | 16(D5=0) |
| OLD DATA(ADR0–4)=13 | 0(D5=0) | 13(D5=1) | 0(D5=0) | 14(D5=1) | 13(D5=1) | 12(D5=1) | 0(D5=1) | 16(D5=0) |
| OLD DATA(ADR0–4)=14 | 0(D5=0) | 14(D5=1) | 0(D5=0) | 15(D5=1) | 14(D5=1) | 13(D5=1) | 0(D5=1) | 16(D5=0) |
| OLD DATA(ADR0–4)=15 | 0(D5=0) | 15(D5=1) | 0(D5=0) | 16(D5=1) | 15(D5=1) | 14(D5=1) | 0(D5=1) | 16(D5=0) |
| OLD DATA(ADR0–4)=16 | 24(D5=1) | 16(D5=1) | 8(D5=0) | 17(D5=1) | 16(D5=1) | 15(D5=1) | 0(D5=1) | 16(D5=0) |
| OLD DATA(ADR0–4)=17 | 0(D5=0) | 17(D5=1) | 0(D5=0) | 18(D5=1) | 17(D5=1) | 16(D5=1) | 0(D5=1) | 16(D5=0) |
| OLD DATA(ADR0–4)=18 | 0(D5=0) | 18(D5=1) | 0(D5=0) | 19(D5=1) | 18(D5=1) | 17(D5=1) | 0(D5=1) | 16(D5=0) |
| OLD DATA(ADR0–4)=19 | 0(D5=0) | 19(D5=1) | 0(D5=0) | 20(D5=1) | 19(D5=1) | 18(D5=1) | 0(D5=1) | 16(D5=0) |
| OLD DATA(ADR0–4)=20 | 22(D5=1) | 20(D5=1) | 18(D5=1) | 21(D5=1) | 20(D5=1) | 19(D5=1) | 0(D5=1) | 16(D5=0) |
| OLD DATA(ADR0–4)=21 | 0(D5=0) | 21(D5=1) | 0(D5=0) | 22(D5=1) | 21(D5=1) | 20(D5=1) | 0(D5=1) | 16(D5=0) |
| OLD DATA(ADR0–4)=22 | 0(D5=0) | 22(D5=1) | 0(D5=0) | 23(D5=1) | 22(D5=1) | 21(D5=1) | 0(D5=1) | 16(D5=0) |
| OLD DATA(ADR0–4)=23 | 0(D5=0) | 23(D5=1) | 0(D5=0) | 24(D5=1) | 23(D5=1) | 22(D5=1) | 0(D5=1) | 16(D5=0) |
| OLD DATA(ADR0–4)=24 | 28(D5=0) | 24(D5=1) | 20(D5=0) | 25(D5=1) | 24(D5=1) | 23(D5=1) | 0(D5=1) | 16(D5=0) |
| OLD DATA(ADR0–4)=25 | 0(D5=0) | 25(D5=1) | 0(D5=0) | 26(D5=1) | 25(D5=1) | 24(D5=1) | 0(D5=1) | 16(D5=0) |
| OLD DATA(ADR0–4)=26 | 0(D5=0) | 26(D5=1) | 0(D5=0) | 27(D5=1) | 26(D5=1) | 25(D5=1) | 0(D5=1) | 16(D5=0) |
| OLD DATA(ADR0–4)=27 | 0(D5=0) | 27(D5=1) | 0(D5=0) | 28(D5=1) | 27(D5=1) | 26(D5=1) | 0(D5=1) | 16(D5=0) |
| OLD DATA(ADR0–4)=28 | 30(D5=1) | 28(D5=1) | 26(D5=1) | 29(D5=1) | 28(D5=1) | 27(D5=1) | 0(D5=1) | 16(D5=0) |
| OLD DATA(ADR0–4)=29 | 0(D5=0) | 29(D5=1) | 0(D5=0) | 30(D5=1) | 29(D5=1) | 28(D5=1) | 0(D5=1) | 16(D5=0) |
| OLD DATA(ADR0–4)=30 | 0(D5=0) | 30(D5=1) | 0(D5=0) | 31(D5=1) | 30(D5=1) | 29(D5=1) | 0(D5=1) | 16(D5=0) |

UNITED STATES PATENT AND TRADEMARK OFFICE
CERTIFICATE OF CORRECTION

PATENT NO. : 4,584,656           Page 3 of 3
DATED      : April 22, 1986
INVENTOR(S): SHINJI SAKAI, ET. AL.

It is certified that error appears in the above-identified patent and that said Letters Patent is hereby corrected as shown below:

Column 16, line 2, change "an" to --a--;

line 14, change "apparoximation" to --approximation--;

line 21, change "the" to --then--; and line 30, change ""0" as" to --"0" is provided as--.

Column 26, line 21, change "acccumulaton" to --accumulation--.

Column 28, line 11, change "fails" to --falls--.

Signed and Sealed this

Twenty-fourth Day of February, 1987

*Attest:*

DONALD J. QUIGG

*Attesting Officer*    *Commissioner of Patents and Trademarks*